United States Patent
Levy et al.

(10) Patent No.: US 9,768,914 B2
(45) Date of Patent: Sep. 19, 2017

(54) BLIND CHANNEL ESTIMATION METHOD FOR AN MLSE RECEIVER IN HIGH SPEED OPTICAL COMMUNICATION CHANNELS

(71) Applicant: Multiphy Ltd., Ness Ziona (IL)

(72) Inventors: Omri Levy, Tel Aviv (IL); Gilad Katz, Sdema (IL); Albert Gorshtein, Ashdod (IL); Dan Sadot, Kfar Bilu (IL)

(73) Assignee: Multiphy Ltd., Ness Ziona (IL)

( * ) Notice: Subject to any disclaimer, the term of this patent is extended or adjusted under 35 U.S.C. 154(b) by 0 days.

(21) Appl. No.: 14/454,363

(22) Filed: Aug. 7, 2014

(65) Prior Publication Data

US 2015/0043926 A1     Feb. 12, 2015

Related U.S. Application Data

(60) Provisional application No. 61/863,474, filed on Aug. 8, 2013.

(51) Int. Cl.
| | |
|---|---|
| *H04L 1/00* | (2006.01) |
| *H04L 25/03* | (2006.01) |
| *H04L 25/02* | (2006.01) |
| *H04B 10/60* | (2013.01) |

(52) U.S. Cl.
CPC ........... *H04L 1/0054* (2013.01); *H04B 10/60* (2013.01); *H04L 25/0238* (2013.01); *H04L 25/03292* (2013.01)

(58) Field of Classification Search
CPC ............... H04L 1/0054; H04L 25/0238; H04L 25/03292; H04B 10/60
See application file for complete search history.

(56) References Cited

U.S. PATENT DOCUMENTS

2012/0148266 A1\*  6/2012  Komaki  ............... H04B 10/611
                                                                   398/210

\* cited by examiner

*Primary Examiner* — Leslie Pascal
(74) *Attorney, Agent, or Firm* — Alston & Bird LLP

(57) ABSTRACT

A method for performing blind channel estimation for an MLSE receiver in a communication channel, according to which Initial Metrics Determination Procedure (IMDP) is performed using joint channel and data estimation in a decision directed mode. This is done by generating a bank of initial metrics that assures convergence, based on initial coarse histograms estimation, representing the channel and selecting a first metrics set M from the predefined bank. Then an iterative decoding procedure is activated during which, a plurality of decision-directed adaptation learning loops are carried out to perform an iterative histograms estimation procedure for finely tuning the channel estimation. Data is decoded during each iteration, based on a previous estimation of the channel during the previous iteration. If convergence is achieved, ISI optimization that maximizes the amount of ISI that is compensated by the MLSE is performed.

5 Claims, 18 Drawing Sheets

BLIND CHANNEL ESTIMATION METHOD FOR AN MLSE RECEIVER IN HIGH SPEED OPTICAL COMMUNICATION CHANNELS

FIELD OF THE INVENTION

The present invention relates to the field of optical data communication. More particularly, the invention relates to a method and system for performing efficient blind maximum-likelihood channel and data equalization in high speed optical communication channels.

BACKGROUND OF THE INVENTION

The task of joint channel and data estimation without a training sequence is of high importance for Maximum Likelihood Sequence Estimation (MLSE) processing, as widely described in prior art. MLSE processing is suitable for fiber optical communication systems. Especially, due to the presence of Polarization Mode Dispersion (PMD—modal dispersion where two different polarizations of light in a waveguide, propagate at different speeds, causing random spreading of the optical pulses), the optical channel is considered to be non-stationary and adaptive equalization is required. When the histograms, which serve as channel estimators, are updated faster than the channel variation rate, successful variations tracking can be achieved.

Maximum Likelihood Sequence Estimation (MLSE) is considered to be a non-linear equalization technique. To explain the main idea that is behind the MLSE processing, trellis diagrams are often used. The example of 4-state trellis diagram is presented in FIG. 1a. In this example, two bits of the channel memory is assumed, i.e., current sample is affected by two previous bit and the current bit. The two previous bits define the channel state, and a conjunction of a state with a current bit defines a branch. The arrows in the trellis represent the transition from one state to another, while a transition that corresponds to a "0" bit is drawn with solid line and a transition corresponding to a "1" is represented by a dashed line. To each branch in the trellis the number called "branch metric" is assigned, which depends on channel and noise statistics. Branch metric describes in some sense the probability of a corresponding transition. Furthermore, one can define a "path metric" which is the sum of corresponding branch metrics for a certain path, when a bit sequence with a smallest path metric is the most probable to be transmitted.

An MLSE processor chooses the path with the smallest metric, and produces the most likely sequence by tracing the trellis back. For a sequence of length N, there are $2^N$ possible paths in the trellis. Therefore, an exhaustive comparison of the received sequence with all valid paths is a cumbersome task, becoming non feasible for channels with a long memory. However, since not all paths have the similar probabilities (or metrics) when proceeding through the trellis, there is an efficient known algorithm, called Viterbi algorithm (is a dynamic programming algorithm for finding the most likely sequence of hidden states), that limits the comparison to $2^K$ "surviving paths", where K is the channel memory length, independent of N, making the maximum likelihood principles to be practically feasible.

The Viterbi Algorithm

From two paths entering the trellis node, the path with the smallest metric is the most probable. Such a path is called the "surviving path", and only surviving paths with their running metrics need to be stored.

Maximum likelihood sequence detection is the most effective technique for mitigating optical channel impairments, such as Chromatic Dispersion (CD—the dependency of the phase velocity of an optical signal on its wavelength) and Polarization Mode Dispersion (PMD). In order to successfully apply this technique, it is mandatory to estimate some key channel parameters, needed by the Viterbi processor.

Conventional channel estimation methods can be classified as parametric and non-parametric. Parametric methods assume that the functional form of the Probability Density Function (PDF—a function that describes the relative likelihood for this random variable to take on a given value) is known, and only its parameters should be estimated. However, non-parametric methods do not assume any knowledge about the PDF functional form or its parameters. There are two most common methods, used in practice for channel estimation: Method of Moments (MoM—a way of proving convergence in distribution by proving convergence of a sequence of moment sequences) and Histogram Method (of estimation).

Method of Moments is considered to be parametric, and therefore, it assumes that the functional form of the PDF is known and only its moments need to be estimated. When the dominant noise mechanism in the optical system is thermal, like in optically unamplified links, the conditional PDF of the received sample $x_n$, given that $\mu_k$ is transmitted, is assumed to be Gaussian with $\sigma_n^2$ being the variance of the noise:

$$f_{channel}^{Gaussian}(x_n \mid \mu_k) = \frac{1}{\sqrt{2\pi\sigma_n^2}} \exp\left\{-\frac{(x_n - \mu_k)^2}{2\sigma_n^2}\right\} \quad \text{[Eq. a]}$$

In this case, only first and second moments need to be estimated. Another case of interest is Amplified Spontaneous Emission (ASE) limited channel. The noise in such a channel becomes signal dependent and the functional form of the conditional PDF of the received sample $x_n$, given that $\mu_k$ is transmitted, can be approximated by a non-central Chi-square distribution with v degrees of freedom:

$$f_{channel}^{ASE}(x_n \mid \mu_k) = \frac{1}{N_0}\left(\frac{x_n}{\mu_k}\right)^{\left(\frac{v-1}{2}\right)} \exp\left\{-\frac{x_n + \mu_k}{N_0}\right\} I_{v-1}\left\{2\frac{\sqrt{x_n\mu_k}}{N_0}\right\} \quad \text{[Eq. b]}$$

Where $I_{\{\cdot\}}$ is the modified Bessel function of the first kind and $N_0$ is power spectral density of the ASE noise given by:

$$N_0 = n_{sp}\frac{hc}{\lambda_0}(G-1)$$

where $n_{sp}$ is the spontaneous emission factor (or population inversion factor), G represents the EDFA gain, $$\frac{hc}{\lambda_0}$$

is the photon energy at the wavelength $\lambda_0$, h being the Plank constant and c being the speed of light. It is clear that in Eq. b, $N_0$ and v need to be estimated.

Histogram Method

The histogram method does not assume anything about the PDF of the received samples. According to this method $M^{N_{isi}}$ histograms are collected, where M represents the vocabulary size of the transmitted symbols and $N_{isi}$ is the number of the most resent previous symbols that affect the current symbol, i.e., the channel memory length assumed by the algorithm. The received signal is assumed to be quantized to $N_{ADC}$ bits; Therefore, each histogram consists of $2^{N_{ADC}}$ bins (discrete intervals), where $N_{ADC}$ is a design parameter. Each histogram can be uniquely associated with a branch in the trellis diagram of the receiver. Assuming that the number of signal samples collected is large, the histogram (normalized so that the sum of all its bins is unity) is an estimate of $f_{channel}(x_n|\mu_k)$. The histogram is updated iteratively, based on the observed samples and the decision bits at the output of the MLSE decoder.

The branch metrics are obtained by taking the natural logarithm of the estimated/assumed PDF. For a transmitted sequence of length N the MLSE decoder chooses between $M^N$ possible sequences that minimize the (path) metric:

$$m_r = \sum_{n=1}^{N} -\ln\{f_{channel}(x_n \mid \mu_k)\} \quad \text{[Eq. c]}$$

The estimated bit sequence is determined by tracing the trellis back, based on the minimal path metric of Eq. c.

In optical fiber systems, the purpose of the MLSE is to overcome ISI stemming from CD and from PMD. While CD is a deterministic phenomena for a given link, PMD is stochastic in nature, and therefore, an adaptive equalizer that performs PMD tracking is required. Moreover, the adaptation properties of the MLSE can be also exploited for CD compensation when the amount of CD is not accurately known. Basically, expensive tunable optical dispersion compensation may be replaced by the adaptive MLSE. This type of operation, without knowing any initial information about the channel parameters and distortion is called "blind equalization".

The constant growth in the demand for high bandwidth data transmission leads to higher challenges that should be resolved in the physical layer, and particularly by optical transmission technology.

The current high end transmission data rates are in the range of hundreds of Gbits/sec. One emerging technology that can support such bitrates for long distances (hundreds of kilometers and above) is coherent transmission and detection. On the other hand, direct detection technology offers the use of lower cost optoelectronic components, consumes less power and enables overall lower latency solution. These advantages may be critical for short reach applications such as sub-hundred kilometers networks of metro-edge and data centers interconnections.

The simpler alternative, (non-coherent) direct detection optical technology is of lower cost, but is limited to lower bit rates and/or shorter distances. For example, increasing the bitrate from 10 Gbit/sec to 25 Gbit/sec, results in distance reduction from ~80 km to ~15 km, for the same Bit Error Rate (BER) performance. The main reason for this limitation is the inter-symbol interference (ISI—a form of distortion of a signal in which one symbol interferes with subsequent symbols) caused by chromatic dispersion (CD) and Polarization Mode Dispersion (PMD). Two techniques are commonly used in order to overcome this ISI. The first technique is based on advanced modulation formats, together with partial response signaling, while the other approach is based on Digital Signal Processing (DSP), applying Electronic Dispersion Compensation (EDC—a method for mitigating the effects of chromatic dispersion in fiber-optic communication links with electronic components in the receiver). The EDC implementations with Maximum Likelihood Sequence Estimation (MLSE) at the receiver (Rx) side, is theoretically the optimal tool to combat ISI, this was very popular for 10 Gbis/sec. The combination of the two approaches is also possible, and was also theoretically investigated for 4×25 Gbits transmission with the use of reduced bandwidth components.

The prior art methods described above for performing equalization of an optical channel are not suitable for blind equalization, since they either require training sequence, or have a low convergence rate, or involve high implementation complexity. Moreover, they require using real data signals to converge, which results in a relatively high initial Bit-Error-Rate (BER—the percentage of bits that have errors relative to the total number of bits received in a transmission) and data loss.

Also, blind channel estimation for the MLSE receiver for direct detection systems allows upgrading the current 10 G systems to 100 G (4×25 G) systems, with extended reach of up to 40 km uncompensated links. The task of joint channel and data blind estimation without a training sequence in hand for optical communication with direct detection is of high importance for MLSE processing. Most of the prior art methods deal with a steady state operation, i.e. the tracking mode. However, the blind estimation of the optical channel suitable for the acquisition/initialization stage is less covered. Although various MLSE acquisition methods exist, most of them either require a training sequence, or have a low convergence rate, or involve high implementation complexity.

It is therefore an object of the present invention to provide a method for performing blind equalization of an optical channel without requiring a training sequence.

It is another object of the present invention to provide a method for performing blind equalization of an optical channel with a high convergence rate.

It is still another object of the present invention to provide a method for performing blind equalization of an optical channel which is easy to implement.

It is a further object of the present invention to provide a method for performing blind equalization of an optical channel which does not require using real data signals to converge.

Other objects and advantages of the invention will become apparent as the description proceeds.

SUMMARY OF THE INVENTION

The present invention is directed to a method for performing blind channel estimation for an MLSE receiver in high speed optical communication channel, according to which Initial Metrics Determination Procedure (IMDP) is performed using joint channel and data estimation in a decision directed mode. This is done by generating a bank of initial metrics that assures convergence, based on initial coarse histograms estimation, representing the channel and selecting a first metrics set M from the predefined bank. Then an iterative decoding procedure is activated during which, a plurality of decision-directed adaptation learning loops are carried out to perform an iterative histograms estimation procedure for finely tuning the channel estimation. Data is decoded during each iteration, based on a previous estimation of the channel during the previous iteration. After checking whether the resulting metrics are converged (e.g., by using a Z-test), if convergence is not achieved, the next metrics set is selected from the bank. If convergence is achieved, ISI optimization that maximizes the amount of ISI that is compensated by the MLSE is performed. If the initial metrics bank is run out of metrics sets, the IMDP is repeated. Finally, a tracking mode is performing, using the decision-directed adaptation loops as tracking loops.

The bank of initial metrics may generated by transmitting a training sequence and generating several metric sets for different channel conditions, based on Method of Moments (MoM) or by a set of FIR filters, each of which having a FIR length which is determined by the memory depth of the MLSE engine.

Data may be decoded by a decoder that is designed such that the channel memory length is at most as the memory length of the decoder.

The FIR filter may be approximated by either pre-cursor dominating ISI filter, post-cursor dominating ISI filter or symmetrical ISI filters.

The convergence tendency of the histogram set may be monitored by using the sampled standard deviation of the central moments after a predetermined number of iterations, or based on training a sequence.

The ISI optimization may be performed by collecting several channel estimates, while each time, setting a different Match Point (MP)-shift between the stream of ADC samples and the stream of the corresponding decision bits and then, selecting the MP-shift that yields the minimal variances-average of the histograms.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF PREFERRED EMBODIMENTS

The present invention proposes a novel, simple and fast blind channel estimation method for direct-detection optical systems, based on blind channel acquisition algorithm, for MLSE equalization in high speed optical communications. It performs joint channel and data estimation in decision directed mode.

The blind channel acquisition algorithm is referred herein as Initial Metrics Determination Procedure (IMDP). The initialization of the IMDP is based on the approximate Discrete Time Equivalent (DTE) model, exploiting the most relevant physical properties of the fiber and the nonlinear photo-detector.

Blind MLSE Architecture and Decoding Principles

For a non-coherent system, maximum likelihood sequence estimation is proven to be the most effective stochastic technique for mitigating optical channel impairments such as chromatic dispersion and polarization mode dispersion. While CD is a deterministic phenomenon for a given link, PMD is stochastic in nature, and therefore an adaptive equalizer that performs PMD tracking is required for proper estimation. Moreover, the adaptation properties of the MLSE can be also exploited for CD compensation when the amount of CD is not perfectly known. Basically, expensive tunable optical dispersion compensation may be replaced by the adaptive MLSE. To ensure sufficient tracking, the adaptation rate must be fast enough, comparing to temporal variations of the channel. Since PMD changes in the scale of 100 μsec-1 m sec, the adaptation rate must be at least ten times faster, meaning that every 10 μsec a new channel estimation must be obtained.

The channel estimates are called metrics, and are obtained by taking the (negative) logarithm of the conditional probability density functions (PDFs) of the received samples $r_n$ given the transmitted sequence $[a_n, a_{n-1}, \ldots, a_{n-N_{isi}+1}]$ of $N_{isi}$ consecutive symbols:

$$M_l(r_n|a_n, a_{n-1}, \ldots, a_{n-N_{isi}+1}) = -\log(f_{channel}(r_n|a_n, a_{n-1}, \ldots, a_{n-N_{isi}+1})), l=0,1,\ldots,V^{N_{isi}+1} \quad [\text{Eq. 1}]$$

where V represents the vocabulary size at the receiver (Rx) side.

The key idea of the MLSE processor is to choose the path $Y_{opt}$ with the smallest running metric $Y_l^{(k)}$ among $V^N$ candidate sequences of length N:

$$Y_{opt} = \min_{0 \le k \le V^N} \{Y_l^{(k)}\} \quad [\text{Eq. 2}]$$

$$Y_l^{(k)} = \sum_{n=0}^{N-1} M_l^{(k)}(r_n | a_n, a_{n-1}, \ldots, a_{n-N_{isi}+1})$$

and produce the most likely sequence by tracing the trellis back. Practical implementations often resort to the computationally efficient Viterbi algorithm. Here, the Histogram Method is used to approximate the PDFs in [Eq. 1]. Since blind equalization is pursued, the histograms are collected in decision directed manner, as shown on FIG. 1b.

Figure 1A:
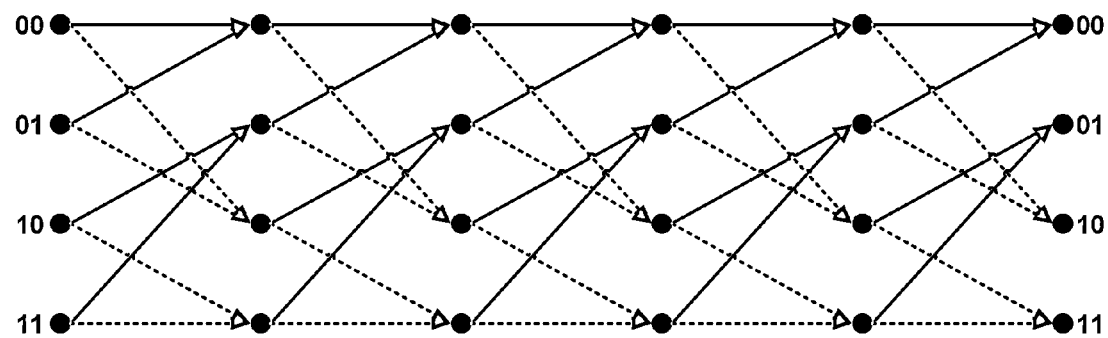
FIG. 1a (prior art) illustrates an example of 4-state trellis diagram
Figure 1B:
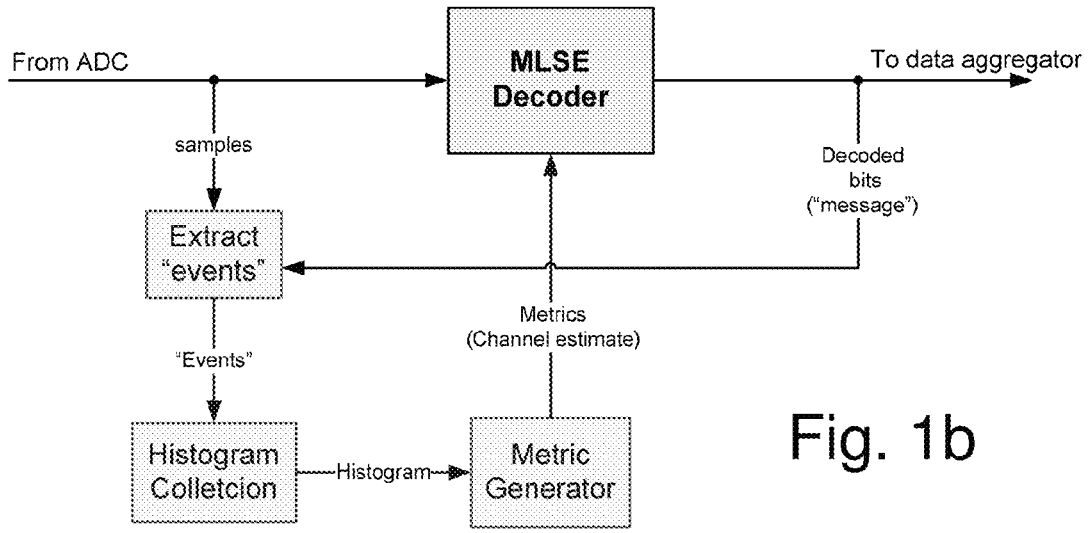
FIG. 1b shows the architecture of blind MLSE equalizer.

In FIG. 1b, The data path consists of the MLSE decoder which processes the samples coming from the Analog-To-Digital Converter (ADC), based on current channel estimation, and passes the outcome bits (or symbols) to the data aggregator for further processing. At the control path, there are three blocks that carry the channel estimation task in the following way. First, the properly delayed incoming samples are attributed to the output of the MLSE decoder, denoted here as "message". Each incoming sample assigned to a group of $N_{isi}+1$ consequent bits (or symbols) in the "message" form an "event". Next, the "events" are counted, and histogram set H, containing $V^{N_{isi}+1}$ branches is obtained by:

$$H=\{H_l(r_n|a_n,a_{n-1},\ldots,a_{n-N_{isi}+1}), l=0,1,\ldots,V^{N_{isi}+1}\}$$

$$H_l(r_n|a_n,a_{n-1},\ldots,a_{n-N_{isi}+1})=f_{channel}(r_n|a_n,a_{n-1},\ldots,a_{n-N_{isi}+1}) \quad [\text{Eq.3}]$$

The signal is quantized to $N_{ADC}$ bits; therefore, each histogram consists of at most $2^{N_{ADC}}$ bins. Finally, after a proper normalization (the sum of all bins in each histogram is unity), and log operation, the branch metrics given by $$M=\{M_l(r_n|a_n,a_{n-1},\ldots,a_{n-N_{isi}+1}), l=0,\ldots,V^{N_{isi}+1}\}$$

are obtained, thereby forming the current channel estimate. In the steady state (tracking mode), the histograms, and thus the metrics, are updated iteratively, based on the observed data.

Blind Channel Acquisition—Initial Metrics Determination Procedure (IMDP)

Figure 2:
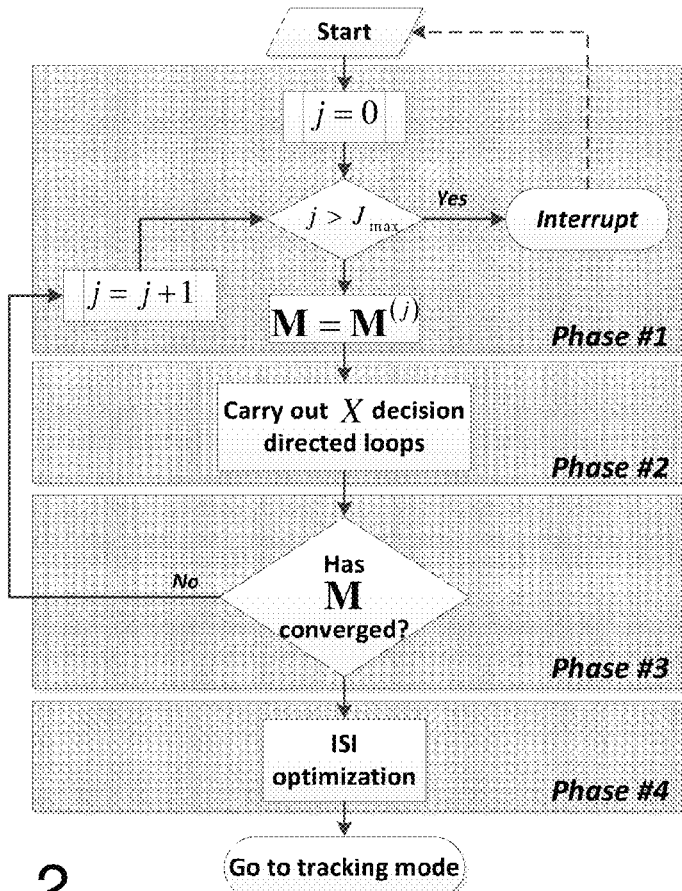
FIG. 2 shows an Initial Metrics Determination Procedure (IMDP), according to an embodiment of the invention.

The algorithmic flowchart of the blind MLSE acquisition stage, referred herein as Initial Metrics Determination Procedure (IMDP), is illustrated in FIG. 2. The IMDP can be divided into four main phases. At the first phase, the metrics set M is taken from the predefined bank. Then, an iterative decoding procedure is activated, and several (X) decision-directed adaptation loops (later on being used as the tracking loops) are carried out. The third phase's goal is to check whether the resulting metrics are converged. If convergence is not achieved, the next metrics set from the bank is taken. Otherwise, additional optimization procedure that maximizes the amount of ISI that is compensated by the MLSE is used. If the initial metrics bank is run out of metrics $j>J_{max}$, then interrupt is generated to the Central Processing Unit (CPU), which may decide to start the IMDP.

Definition of the Metrics Bank $\mathcal{M}$

The Approximate Overall Channel DTE Model

Direct detection optical channel systems are nonlinear in nature, mainly due to the square-law operation in the photo-detector and the intensity dependence of the fiber refractive index (the Kerr effect—a change in the refractive index of a material in response to an applied electric field.). Thus, the noiseless incoming sample is represented by a nonlinear combination of transmitted symbol $a_n$ and past $N_{isi}^{(channel)}$ symbols:

$$r_n = \Gamma\left(a_n, a_{n-1}, \cdots, a_{n-N_{isi}^{(channel)}+1}\right) \quad [\text{Eq. 4}]$$

For the purposes of coarse channel estimation, it is assumed that the predominant nonlinearity comes from the square-law detection, and the fiber non-linearity Kerr effect can be neglected. At the photo-detection input point, the Discrete Time Equivalent model (DTE) accounting for the transmitter shaping, Optical Fiber (OF), CD and first order PMD, is given by:

$$H_{DTE}^{Tx+fiber}[n] \equiv \begin{pmatrix} \sqrt{\gamma}\,\delta_n & 0 \\ 0 & \sqrt{1-\gamma}\,\delta_{n+\tau} \end{pmatrix} * h_{CD}[n] * h_{Tx}[n] * h_{OF}[n] \quad [\text{Eq. 5}]$$

where $$\delta_{n-k} \equiv \begin{cases} 1, n=k \\ 0, \text{else} \end{cases}$$

is the discrete Kronecker delta function, and '*' denotes the convolution operation. The effect of first order PMD in [Eq. 5] is represented by a discrete time 2×2 diagonal matrix with power splitting coefficient $\gamma$ and Differential Group Delay (DGD the difference in propagation time between the two eigenmodes X and Y polarizations.) $\tau$. In order to be compatible with the DTE model, $\tau$ in [Eq. 5] is rounded up to the nearest value which is multiple of the symbol duration. It should be stressed here, that the latter adjustment does not represent the exact PMD behavior, but is certainly sufficient for the purpose of coarse channel estimation, pursued here to obtain only a starting point for the initial MLSE metrics. Chromatic dispersion can also be represented by a Finite Impulse Response (FIR) filter with $N_{CD}$ taps (the filter length):

$$h_{CD}[n] = \sqrt{-jW}\,e^{jn\pi W n^2}, \quad [\text{Eq. 6}]$$
$$-\frac{N_{CD}-1}{2} \leq n \leq \frac{N_{CD}-1}{2}$$
$$W = \frac{c}{f_s^2 \cdot CD \cdot \lambda_0^2},$$
$$N_{CD} = 2 \cdot \left\lfloor \frac{1}{2W} \right\rfloor + 1$$

where c is the speed of light, $\lambda_0$ is the wavelength of the optical carrier, CD is the amount of chromatic dispersion and $f_s$ is the sampling frequency. By denoting the scalar part of $H_{DTE}^{Tx+fiber}[n]$ by $$\psi[n] \equiv h_{CD}[n]*h_{Tx}[n]*h_{OF}[n] \quad [\text{Eq.7}]$$

the signal at the photo-detector input can be written as:

$$x[n] = \left(H_{DTE}^{Tx+fiber}[n]*a_n\right) + z_{ASE}[n] = s_n + z_{ASE}[n] \quad [\text{Eq. 8}]$$

spontaneous emission, that has been optically amplified by a laser source) noise vector coming from optical amplifiers (in both polarizations) and $s_n$ is the DTE signal component given by:

$$s_n = \begin{pmatrix} \sum_{k=-\frac{N_{Ch}-1}{2}}^{\frac{N_{Ch}-1}{2}} \psi[k]\cdot\sqrt{\gamma}\cdot a_{n-k} \\ \sum_{k=-\frac{N_{Ch}-1}{2}}^{\frac{N_{Ch}-1}{2}} \psi[k]\cdot\sqrt{1-\gamma}\cdot a_{n-k+\tau} \end{pmatrix} \quad [\text{Eq. 9}]$$

where $N_{Ch}$ represents the length of scalar impulse response $\psi[n]$ in units of symbol duration:

$$N_{Ch}=N_{CD}+N_{Tx}+N_{OF}-2 \quad [\text{Eq.10}]$$

where $N_{Tx}$ and $N_{OF}$ are the impulse response lengths of the transmitter (Tx) and optical filter respectively. Similarly, the overall length of the channel impulse response (including the PMD effect is $N_{overall}=N_{ch}+\tau$.

The recorded signal at the Photo-Detector (PD) output, is given by:

$$u_n = R \cdot (Tr\{s_n \cdot s_n^H\}) * h_{Rx}[n] + w_n = r_n + w_n \quad [\text{Eq.11}]$$

where 'Tr' denotes the trace operation, 'H' represents the Hermitian conjugate operation, R is the PD responsivity, $h_{Rx}[n]$ is the photo-detector electronic impulse response, and $w_n$ represents all the noises present in the system: signal-spontaneous, spontaneous-spontaneous, thermal, shot and dark current. The expanded expression of the signal term accounting for the trace operation:

$$y_n \triangleq Tr\{s_n \cdot s_n^H\} \quad [\text{Eq.12}]$$

is given by:

$$y_n = \left| \sum_{k=-\frac{N_{Ch}-1}{2}}^{\frac{N_{Ch}-1}{2}} \psi[k] \cdot \sqrt{\gamma} \cdot a_{n-k} \right|^2 + \left| \sum_{k=-\frac{N_{Ch}-1}{2}}^{\frac{N_{Ch}-1}{2}} \psi[k] \cdot \sqrt{1-\gamma} \cdot a_{n+\tau-k} \right|^2 \quad [\text{Eq. 13}]$$

$$y_n = \sum_{k=-\frac{N_{Ch}-1}{2}}^{\frac{N_{Ch}-1}{2}} \gamma \cdot |\psi[k]|^2 \cdot |a_{n-k}|^2 + \quad [\text{Eq. 14}]$$

$$\sum_{k=-\frac{N_{Ch}-1}{2}}^{\frac{N_{Ch}-1}{2}} (1-\gamma) \cdot |\psi[k]|^2 \cdot |a_{n+\tau-k}|^2 +$$

$$\Re\left\{ \sum_{k=-\frac{N_{Ch}-1}{2}}^{\frac{N_{Ch}-1}{2}} \sum_{\substack{l=-\frac{N_{Ch}-1}{2} \\ k \neq l}}^{\frac{N_{Ch}-1}{2}} \gamma \cdot \psi[k] \cdot \psi'[l] \cdot a_{n-k} \cdot a'_{n-l} \right\} +$$

$$\Re\left\{ \sum_{k=-\frac{N_{Ch}-1}{2}}^{\frac{N_{Ch}-1}{2}} \sum_{\substack{l=-\frac{N_{Ch}-1}{2} \\ k \neq l}}^{\frac{N_{Ch}-1}{2}} (1-\gamma) \cdot \psi[k] \cdot \psi'[l] \cdot a_{n+\tau-k} \cdot a'_{n-\tau-l} \right\}$$

where $\Re e$ is the real part of the complex signal, and "'" designates the complex conjugate. Thus, according to [Eqs.11-14] the operator $$\Gamma\left(a_n, a_{n-1}, \cdots, a_{n-N_{isi}^{(channel)}+1}\right)$$

in [Eq.4] is given by:

$$r_n = \Gamma\left(a_n, a_{n-1}, \cdots, a_{n-N_{isi}^{(channel)}+1}\right) = R \cdot y_n * h_{Rx}[n] \quad [\text{Eq. 15}]$$

Equations [Eqs.11-14] will be used in the following sections to derive a coarse FIR approximation of the function $$\Gamma\left(a_n, a_{n-1}, \cdots, a_{n-N_{isi}^{(channel)}+1}\right),$$

which is shown to be a good initial guess for the initialization of the MLSE acquisition process.

Definition of the Metrics Bank $\mathcal{M}$ for Phase #1

The key function that enables the blind MLSE processing is the proper definition of the metrics bank $\mathcal{M} \square \{M^{(j)}, j=0, \ldots, J_{max}-1\}$, which allows operation in decision directed mode. These can be obtained by preparing a predetermined metrics bank, for example by transmitting a known data (training sequence) followed by generating and storing several metric sets for different channel conditions, as described in FIG. 1b. In turn, while deployed in the system, the IMDP, described in FIG. 2, can be activated, and a proper initial set of metrics can be selected from the bank $\mathcal{M}$.

The present invention proposes a novel approach for the definition of the metrics bank $\mathcal{M}$ based on Method of Moments (MoM), combined with knowing the physical behavior of the optical fiber. Since only coarse channel representation is needed, it may be assumed that the branch histograms $H_i(r_n|a_n, a_{n-1}, \ldots, a_{n-N_{isi}+1})$ have nearly a Gaussian shape and differ from each other only by the mean and variance. The mean values depend on the channel memory length $N_{isi}^{(channel)}$, the data vocabulary size V, and the dominant noise mechanism in the system. To ensure proper operation, the decoder is designed such that the channel memory length is at most as the memory length of the decoder: $N_{isi} \geq N_{isi}^{(channel)}$.

In this case, there are $V^{N_{isi}+1}$ branches, whereas the variance of each histogram is associated with the noise power that is present in the corresponding combination describing the branch. For example, in a memory-less channel with binary vocabulary (V=2) there are two histograms, representing the corresponding conditional PDFs, and simple hard decision scheme can be used. When V=2 and $N_{isi}^{(channel)}=1$ there are four distinct histograms, with four different mean values. Generally, when $N_{isi} \geq N_{isi}^{(channel)}$, the actual number of histograms in the given MLSE decoder is constant, $N_{br}=V^{N_{isi}+1}$, and consists of different groups, while all the members of such a group are identical. Continuing the example (V=2 and $N_{isi}^{(channel)}=1$), for $N_{isi}=4$ there are 32 branches. These branches can be divided into four groups, associated with the four different mean values mentioned above.

Based on the argumentation above, the problem of selecting the proper set of metrics bank $\mathcal{M}$ can be formulated as follows: Finding the set of $V^{N_{isi}+1}$ mean values and corresponding variances that, together with Gaussianity assumption and correct ordering, lead to conditional PDFs that coarsely but still reliably describe the channel, i.e. result in BER that is low enough ($<10^{-2}$) to allow operation in decision directed mode. Thus, a bank of metrics $\mathcal{M}$ is sought, which are derived from histogram sets $\mathcal{H} \square \{H^{(j)}, j=0, \ldots, J_{max}\}$, having Gaussian shapes with the mean values vectors $\mu_j$ and corresponding variances vectors $\sigma_j^2$. Hence, the metrics in $\mathcal{M}$ have the following form:

$$M^{(j)} = \sqrt{2\pi}\sigma_j - (\tilde{r}_n - \mu_j)^2./(2\sigma_j^2), j=0, \ldots, J_{max}-1 \quad [\text{Eq.16}]$$

where the '.1' represents the element-wise (Matlab-like) vector division operation.

The values $\mu_j$ can be determined by the FIR approximation of the operator $\Gamma(\cdot)$ given by [Eq.15]. Without loss of generality, the following analysis is restricted to the simplest On-Off-Keying (OOK) modulation format, i.e., V=2.

It is assumed that the Non-Return-to-Zero (NRZ) shaping pulse at the transmitter (Tx) is represented by the following impulse response $h_{Tx}[n]=K_1\delta_n$ in the DTE model, where $N_{Tx}=1$ in [Eq.10], and the constant $K_1$ depends on the transmitted power. It is also assumed that the bandwidth of the optical filter is wide enough, such that at the sampling point, the DTE impulse response of the OF is $h_{OF}[n]=K_2\delta_n$, where $N_{OF}=1$ and $K_2$ depends on the OF shape.

In practice, the length of $h_{OF}[n]$, $N_{OF}$, may be longer than a single symbol duration, especially in the environment of concatenated optical filtering (with optical add drop multiplexers). Consequently, according to [Eq.10] the length of the scalar impulse response is dominated by the length of $h_{CD}[n]$, $N_{CD}$ and [Eq.7] can be rewritten as:

$$\psi[n] \approx K_1 K_2 h_{CD}[n], \quad \text{[Eq. 17]}$$
$$-\frac{N_{ch}-1}{2} \leq n \leq \frac{N_{ch}-1}{2},$$
$$N_{ch} = N_{CD}$$

Using similar argumentation, it can be assumed that $h_{Rx}[n]=K_3\delta_n$. For an OOK format $a_n=|a_n|^2$, and substituting [Eq.6], [Eq.14] and [Eq.17] to [Eq.15] yields:

$$r_n = \gamma K \sum_{k=-\frac{N_{CD}-1}{2}}^{\frac{N_{CD}-1}{2}} a_{n-k} + (1-\gamma)K \sum_{k=-\frac{N_{CD}-1}{2}}^{\frac{N_{CD}-1}{2}} a_{n+\tau-k} + \quad \text{[Eq. 18]}$$

$$\gamma K \sum_{k=-\frac{N_{CD}-1}{2}}^{\frac{N_{CD}-1}{2}} \sum_{\substack{l=-\frac{N_{CD}-1}{2} \\ k \neq l}}^{\frac{N_{CD}-1}{2}} \cos(\pi \cdot W \cdot (k-l)^2) \cdot a_{n-k} \cdot a_{n-l} + (1-\gamma)$$

$$K \sum_{k=-\frac{N_{CD}-1}{2}}^{\frac{N_{CD}-1}{2}} \sum_{\substack{l=-\frac{N_{CD}-1}{2} \\ k \neq l}}^{\frac{N_{CD}-1}{2}} \cos(\pi \cdot W \cdot (k-l)^2) \cdot a_{n+\tau-k} \cdot a_{n+\tau-l}$$

where $K \triangleq RK_1^2 K_2^2 K_3 W$, $K>0$ is the non-negative proportionality constant that depends on the responsivity and shapes of the transmitter (Tx), optical and receiver (Rx) filters.

The first two terms of [Eq.18] represent the linear part of $r_n$, and can be regarded as the sum of the responses of two FIR filters with rectangular shapes, relatively delayed by $\tau$:

$$\hat{b}_k = \gamma K \cdot \Pi\left(\frac{k}{N_{CD}}\right) + (1-\gamma) \cdot K \cdot \Pi\left(\frac{k-\tau}{N_{CD}}\right) \quad \text{[Eq. 19]}$$

Thus, as a first order approximation of $\Gamma(\bullet)$, a metrics bank may be defined by quantizing $\gamma$ and building all possible combinations of the coefficients, corresponding to various delays $\tau$. The last two terms of [Eq.18] account for nonlinear interaction between the transmitted symbols, and may be viewed as a data dependent FIR filters, whose coefficients are proportional to $\cos(\pi \cdot W \cdot (k-l)^2)$:

$$\tilde{b}_k\left(a_{n-\frac{N_{CD}-1}{2}}, \cdots, a_{n+\frac{N_{CD}-1}{2}+\tau}\right) = \quad \text{[Eq. 20]}$$

$$\gamma K \sum_{\substack{l=-\frac{N_{CD}-1}{2} \\ k \neq l}}^{\frac{N_{CD}-1}{2}} \cos(\pi \cdot W \cdot (k-l)^2) \cdot a_{n-l} +$$

$$(1-\gamma)K \sum_{\substack{l=-\frac{N_{CD}-1}{2}-\tau \\ k \neq l}}^{\frac{N_{CD}-1}{2}-\tau} \cos(\pi \cdot W \cdot (k-l)^2) \cdot a_{n-l}$$

These two terms contribute to the overall sum only when the corresponding data-dependent coefficients are non-zero. On average this filter can be approximated as:

$$E\left\{\tilde{b}_k\left(a_{n-\frac{N_{CD}-1}{2}}, \cdots, a_{n+\frac{N_{CD}-1}{2}+\tau}\right)\right\} = \quad \text{[Eq. 21]}$$

$$\gamma K \sum_{\substack{l=-\frac{N_{CD}-1}{2} \\ k \neq l}}^{\frac{N_{CD}-1}{2}} \cos(\pi \cdot W \cdot (k-l)^2) \cdot E\{a_{n-l}\} +$$

$$(1-\gamma)K \sum_{\substack{l=-\frac{N_{CD}-1}{2}-\tau \\ k \neq l}}^{\frac{N_{CD}-1}{2}-\tau} \cos(\pi \cdot W \cdot (k-l)^2) \cdot E\{a_{n-l}\}$$

where $E\{\bullet\}$ represents the mathematical expectation operator. For OOK modulation format $E\{a_n\}=0.5$, thus on average the contribution of the last two terms in [Eq.18], is at most half of the first two terms.

[Eq. 19] and [Eq. 20] summarize the exact mathematical model of the overall channel DTE FIR. For pragmatic acquisition purposes a coarse approximation is proposed. A closer examination of [Eq. 19] and [Eq. 20] reveals that while [Eq.19] represents rectangular shape, [Eq.20] represents the sum of half period cosine terms multiplied by the random data samples. It can be shown empirically (by plotting the sum of [Eq.19] and [Eq.20] for various data, CD and PMD values) that the FIR-equivalent filter can be approximated by either pre-cursor dominating ISI (next bit effect), post-cursor dominating ISI (previous bit effect) or symmetrical ISI filters.

Consequently, the bank of metrics $\mathcal{M}$, can be generated by the following set of FIR filters 11, $\mathbf{b}_j \triangleq \{b_j, j=0, \ldots, J_{max}\}$, where $b_j$ is given by:

$$b_j[n] = \begin{cases} \dfrac{c^n}{\sum_{l=1}^{m+1} c^l}, & j = 0, \cdots, N_{isi}-1, m = (j+1)\text{mod}N_{isi} \\[2ex] \dfrac{c^{-n}}{\sum_{l=1}^{m+1} c^{-l}}, & j = N_{isi}, \cdots, 2N_{isi}-1, m = (j+1)\text{mod}N_{isi} \\[2ex] \dfrac{c^{|n|}}{\sum_{l=\lfloor N_{isi}/2 \rfloor -m+1}^{\lfloor N_{isi}/2 \rfloor} c^{|l|}}, & j = 2N_{isi}, \cdots, 3N_{isi}-1, \\ & m = (j+1)\text{mod}N_{isi}, m \neq 0, m \neq N_{isi}-1 \end{cases} \quad \text{[Eq. 22]}$$

The indexes in [Eq.22] are summarized as follows: j represents the serial number of each element in the proposed set of FIR set $\mathbf{b}_j$, n represents the discrete time axis of the impulse response $b_j$, and m is related to the impulse response length. The number of coefficients in each element of $\mathbf{b}_j$ (the FIR length) is determined by the memory depth of the MLSE engine, $N_{isi}$. The design parameter c in [Eq.22] describes the distribution of ISI in each element of $\mathbf{b}_j$ (the FIR shape), which, in turn, determines the value of the mean vector $\mu_j$ in [Eq.16]. The actual FIR shape is found to be less critical since only coarse channel model is required for the acquisition stage. Therefore, its value is selected to optimize implementation complexity. In this work, c=2 was used, and satisfactory results are obtained as presented in the below examples.

Figure 3:
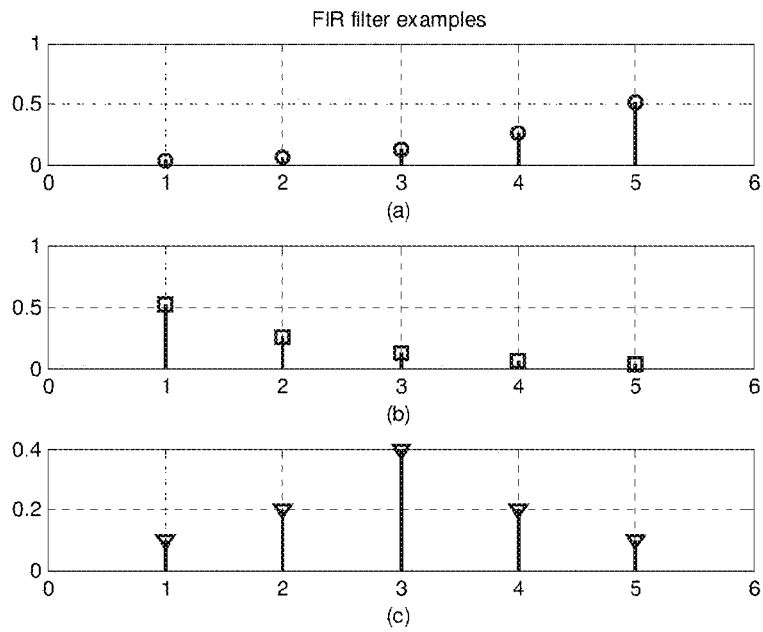
FIGS. 3a-3c show FIR filter examples for generation of metrics bank.

FIGS. 3a-3c illustrate examples of FIRs corresponding to each line in [Eq.22] for c=2 and $N_{isi}$=4, for j=0 (increasing exponent) j=4 (decaying exponent and for j=8 (symmetrically decaying exponent), respectively.

Practically, the MLSE decoder memory length is typically small ($N_{isi}$<5), and the number of elements in $\mathcal{M}$ is finite and not too large. For example, in the ASIC, $N_{isi}$=4, resulting in $J_{max}$=10 matrices in the bank as dictated by [Eq.22]: 4 matrices with pre-cursor ISI, 4 with post-cursor ISI and 2 with symmetric ISI behavior. The overall acquisition time of the IMDP, in the worst case (when all matrices in the bank should be examined) increases linearly with $J_{max}$.

The mean vectors in [Eq.16] can be obtained using [Eq.22] as follows:

$$\mu_j = A \cdot b_j \cdot (2^{N_{ADC}} - 1) \qquad [Eq.23]$$

where, in the simplest case, A is the $V^{N_{isi}+1} \times (N_{isi}+1)$ matrix having all possible combinations of symbols in the vocabulary in increasing order, and $N_{ADC}$ is the nominal bit count of the ADC.

Similarly, the vector of variances values $\sigma_j^2$ is calculated as follows:

$$\sigma_j^2 = S \cdot b_j^2 \qquad [Eq.24]$$

where S is the $V^{N_{isi}+1} \times (N_{isi}+1)$ matrix, with all possible combinations of symbols in the vocabulary in increasing order like A, but the values of various vocabulary symbols are replaced by the variance values, corresponding to these symbols in ISI free scenario. The variance values are typically derived from the Signal to Noise Ratio conditions in the system. In an optically amplified system the standard deviation for '1', is higher than for '0', depending on the OSNR conditions.

For example, taking V=2, $N_{isi}$=1, the matrices A and S have the following form:

$$A = \begin{bmatrix} 0 & 0 \\ 0 & 1 \\ 1 & 0 \\ 1 & 1 \end{bmatrix} \qquad [Eq. 25]$$

$$S = \begin{bmatrix} \mathrm{Var}(`0') & \mathrm{Var}(`1') \\ \mathrm{Var}(`0') & \mathrm{Var}(`1') \\ \mathrm{Var}(`1') & \mathrm{Var}(`0') \\ \mathrm{Var}(`1') & \mathrm{Var}(`1') \end{bmatrix}$$

where Var('0') and Var('1') are determined according to the worst case OSNR the system is designed to tolerate (typically slightly below the pre- Forward Error Correction value), that depend both on signal and noise power in the system.

The Convergence Test (Phase #3) and Convergence Criterion

In order to verify whether the X learning loops during phase #2, a channel estimate M that describes the channel reliably enough is provided, such that successful operation in decision directed mode is possible (BER<$10^{-2}$) and the histograms in the corresponding histogram set H must possess certain statistical properties.

The only assumption that forms the basis of derivation of these properties is that the transmitted symbols are equiprobable, i.e.:

$$P(a_i) = \frac{1}{V}, \forall i \qquad [Eq. 26]$$

That this assumption is also needed for using MLSE instead of Maximum A Posteriori Probability (MAP—a mode of the posterior distribution.) algorithm, and generally hold in practical systems which employ source coding and scrambling. In turn, [Eq.26] implies that the probability to transmit any combination of $N_{isi}$+1 consecutive symbols is:

$$p = \frac{1}{V^{N_{isi}+1}} \qquad [Eq. 27]$$

Therefore, if the decoder works correctly and the channel estimate M is reliable, there are $N_{br} = V^{N_{isi}+1}$ branches in histogram set H, each having an equal probability p to appear. In other words, the probability to assign the observation at the decoder input $u_n$ to the correct combination of $N_{isi}$+1 consecutive decisions at the decoder output $\Gamma_i$ is p, i.e., the probability of the "event" $u_n \in \Gamma_i$, i=0, ..., $V^{N_{isi}+1}$ is Binomially distributed and is given by:

$$P(u_n \in \Gamma_i) = p, \ i=0, \ldots, N_{br}-1 \qquad [Eq.28]$$

Thus the total number of events in each branch is given by:

$$m_0^{(i)} \triangleq \sum_{u_n \in \Gamma_i} \delta_{u_n \in \Gamma_i}, \ i = 0, \ldots, N_{br} - 1 \qquad [Eq. 29]$$

is a Gaussian random variable with an expectation value Np and variance Np(1−p):

$$f_{m_0^{(i)}}(m_0^{(i)}) = \frac{1}{\sqrt{2\pi N p(1-p)}} \exp\left\{-\frac{(m_0^{(i)} - Np)}{2Np(1-p)}\right\}, \qquad [Eq. 30]$$

$$i = 0, \ldots, N_{br} - 1$$

where N is the total number of observations, used to build the whole histogram set H. Hence, a widely used Z-test (a statistical test for which the distribution of the test statistic under the null hypothesis can be approximated by a normal distribution) is proposed here as a convergence criterion for each branch $H_i \in H$, $0 \le i \le N_{br}-1$. Based on [Eq.30] the null hypothesis is:

$$m_0^{(i)} = Np, \ i=0, \ldots, N_{br}-1 \qquad [Eq.31]$$

and the Z-statistics is given by:

$$z = \frac{(m_0^{(i)} - Np)}{\sqrt{Np(1-p)}}, \ i = 0, \ldots, N_{br} - 1 \qquad [Eq. 32]$$

The two-tailed P-value (the probability of obtaining a test statistic result at least as extreme as the one that was actually observed), or the probability that successfully converged metrics would be classified as non-converged is given by:

$$\varepsilon - 2Q(z) = \frac{2}{\sqrt{2\pi}} \int_z^\infty e^{-\frac{x^2}{2}} dx \quad [\text{Eq. 33}]$$

Thus based on $\varepsilon$, the practical convergence test translates into:

$$thr_{low} \leq m_0^{(i)} \leq thr_{high}, \; i=0, \ldots, N_{br}-1 \quad [\text{Eq.34}]$$

i.e., to check whether the obtained event count in each branch lies between the two threshold values, defined by [Eq.34], where:

$$thr_{low} = Np - \sqrt{Np(1-p)} \cdot Q^{-1}\left(\frac{\varepsilon}{2}\right) \quad [\text{Eq. 35}]$$

$$thr_{high} = Np + \sqrt{Np(1-p)} \cdot Q^{-1}\left(\frac{\varepsilon}{2}\right)$$

Therefore, meeting the conditions in [Eq.35] indicates that the detected symbols obey the equiviprobability assumption of [Eq.26].

Convergence Monitoring During Phase #2

Based on the argumentation in section 4.3, it is possible to use the sampled standard deviation of the central moments after d-th iteration, designated as $std(m_0)[d]$, in order to monitor the convergence tendency of the histogram set H during phase #2:

$$std(m_0)[d] \equiv \sqrt{\frac{1}{N_{br}-1} \sum_{i=0}^{N_{br}-1} (m_0^{(i)}[d] - Np)^2}, \quad [\text{Eq. 36}]$$

$$d = 0, \ldots, X-1$$

The idea behind [Eq.36] is that if during phase #2 H has the tendency to converge, after X iterations, each branch will have a similar number of events, and $std(m_0)[X-1]$ will go to zero.

In addition, an additional figure of merit is proposed, based on training a sequence, for illustrational purposes only. In this case the histogram set, $H_{training}$ is known, and one can measure the closeness of the obtained set $H_{blind}$ by means of sample Kullback-Leibler (KL—a non-symmetric measure of the difference between two probability distributions P and Q) distance:

$$D_{KL}(i) \equiv D_{KL}(H_i^{training} \| H_i^{blind}) = \quad [\text{Eq. 37}]$$

$$\sum_{m=0}^{2^{N_{ADC}}-1} \ln\left(\frac{H_i^{training}(m)}{H_i^{blind}(m)}\right) \cdot H_i^{training}(m)$$

After treating all the KL-distances in $H_{blind}$ as a vector in a linear space, a Euclidian norm of KL distances $D_{KL}(i)$ can be used to monitor the convergence process during phase #2:

$$D_{ED}(H_{training} \| H_{blind}) \equiv \sqrt{\sum_{i=0}^{N_{br}-1} [D_{KL}(i)]^2} \quad [\text{Eq. 38}]$$

Furthermore, the Bit Error Rate (BER), obtained by direct error counting will be used to illustrate that the proposed figure of merit behaves correctly, i.e. convergence in terms of $std(m_0)$ results also in BER convergence.

Match Point (MP) and ISI Optimization (Phase #4)

According to [Eq.4], the incoming sample is a nonlinear combination of a current symbol $a_n$ and $N_{isi}^{(channel)}$ previous symbols. The MLSE equalizer operates perfectly, if the memory length of the decoder $N_{isi}$ is greater than the channel memory, i.e. $N_{isi} \geq N_{is}^{(channel)}$. However, in practical scenarios, the opposite statement holds, i.e. $N_{isi} < N_{isi}^{(channel)}$. In this case, the MLSE equalizer performs sub-optimally, since it takes care only for the first $N_{isi}$ terms, leaving some portion of residual ISI uncompensated. This residual ISI is treated by the decoder as noise, and is reflected into the variances of the branch histograms:

$$\sigma_l^2 = \sigma_{noise}^2(l) + \sigma_{ADC}^2 + \sigma_{residual\;ISI}^2, \; 0 \leq l \leq N_{br} \quad [\text{Eq.39}]$$

where $\sigma_{noise}^2(l)$ is the receiver random noise (both thermal and optical induced noises), and $\sigma_{ADC}^2$ is ADC related noise that includes quantization, jitter, etc. Usually, if the decoder is designed correctly, the amount of the residual ISI is small and the effect on the performance is negligible. i.e., $\sigma_{residual\;ISI}^2 \boxminus \sigma_{noise}^2(l) + \sigma_{ADC}^2$, $0 \leq l \leq N_{br}$. But, when the amount of the impairments in the channel is high the residual ISI may dominate.

If a simple FIR channel with $N_{isi}^{(channel)}$ coefficients is used, the noiseless received sample $r_n$ is given by:

$$r_n = \sum_{k=0}^{N_{isi}^{(channel)}-1} b_k a_{n-k} \quad [\text{Eq. 40}]$$

The ISI in the system can be divided into two groups: the ISI handled by the MLSE with memory of $N_{isi}$ symbols, and the residual ISI. The handled ISI should be selected according to a peak-distortion criterion:

$$\max_{n_0 \in (0,L)} \sum_{n=n_0}^{n_0+N_{isi}} |b_n| \quad [\text{Eq. 41}]$$

Thus, there is a subset of $L = N_{isi}^{(channel)} - N_{isi}$ taps that is not compensated, and generates the residual ISI noise with variance $\sigma_{residual\;ISI}^2$. For the system with V equiprobable symbols (symbols with equal probabilities)

$$\sigma_{residual\_ISI}^2 = \sigma_a^2 \sum_{n=n_0}^{n_0-1} |b_n|^2 + \sigma_a^2 \sum_{n=n_0+N_{isi}+1}^{N_{isi}^{(channel)}} |b_n|^2 \quad [\text{Eq. 42}]$$

where $\sigma_a^2$ is the variance of the transmitted constellation, is given by:

$$\sigma_a^2 = \frac{1}{V}\sum_{k=0}^{V-1} a_k^2 - \left(\frac{1}{V}\sum_{k=0}^{V-1} a_k\right)^2, \quad [\text{Eq. 43}]$$

$\forall a_k \in \text{Vocabulary}$

In the case of an OOK system, the received signal is described in [Eq.18], and the peak-distortion criteria can be extended:

$$\max_{n_0 \in (0,L)} \sum_{n=n_0}^{n_0+N_{isi}} |E\{\hat{b}_n + \tilde{b}_n\}| \quad (1)$$

where $\hat{b}_n$ is the given by [Eq.19] and $\tilde{b}_n$ is the data-dependent FIR that can be approximated by [Eq.20]. Consequently, $\sigma_{residual\ ISI}^2$ can be approximated by [Eq.42] where $b_n$ is replaced by $E\{\hat{b}_n + \tilde{b}_n\}$.

The optimal $n_0$ is called Match Point (MP), and in practice the ISI optimization is done by collecting several channel estimates (histograms), while each time, a different MP-shift $n_0$ is set between the stream of ADC samples and the stream of the corresponding decision bits. Thus, each histogram represents a selection of a different subset of the channel ISI to be compensated by the MLSE. The contribution of $\sigma_{noise}^2(l)$ and $\sigma_{ADC}^2$ in [Eq.39] is the same, averagely. Therefore, the variances-average of the histograms' changes between these $n_0$ shifts, and is determined by the $\sigma_{residual\ ISI}^2$. Hence, the selected $n_0$ (the correct MP-shift) is the one that yields the minimal variances-average of the histograms:

$$MP = \min_{n_0} \sigma_{average}^2(n_0) \quad [Eq. 45]$$

$$\sigma_{average}^2(n_0) = \langle \sigma_l^2(n_0) \rangle = \frac{1}{N_{br}} \sum_{l=0}^{N_{br}-1} \sigma_l^2(n_0)$$

Experimental Setup and ASIC Parameters

Figure 4:
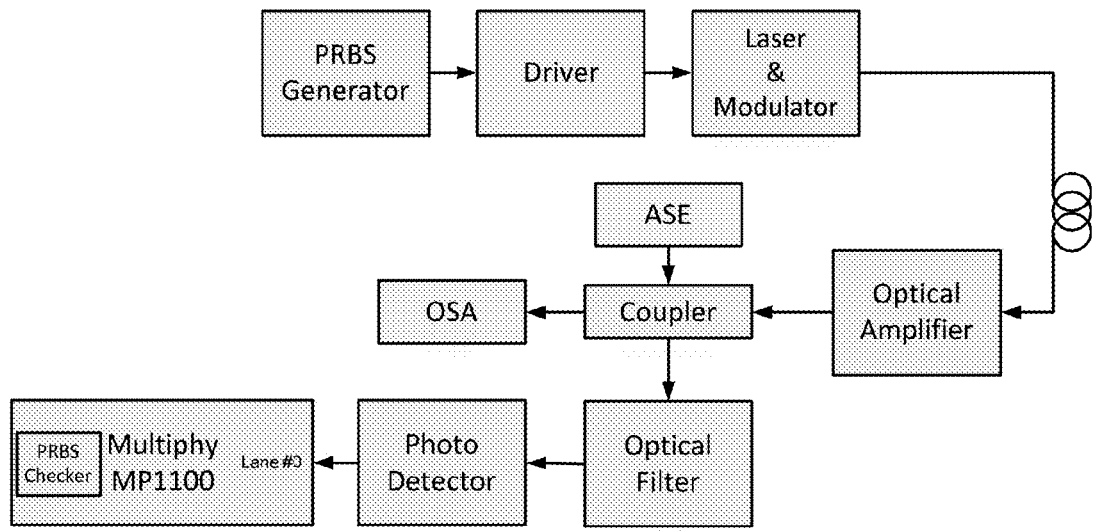
FIG. 4 shows a block diagram an experimental setup used.

The proposed IMDP method was implemented within the Q ASIC and was verified experimentally using the following optical setup, shown in FIG. 4. The Pseudo-Random Bits Sequence (PRBS) of length $2^{31}-1$ was generated and amplified by the driver, to modulate the optical carrier. A Mach-Zehnder Modulator (MZM) following a 1550 nm Distributed Feedback (DFB) laser was used. The optical channel was a Standard Single Mode Fiber (SSMF) including an optical amplifier and an ASE noise source. Optical spectrum analyzer was used to measure the Optical Signal-To-Noise Ratio (OSNR). A 50 GHz optical filter was used in order to reduce the amount of received noise at the PIN Photo Detector (PD). The received electrical signal was processed by the ASIC, which has a built-in Pseudo-Random Binary Sequence (PRBS) checker that was used to obtain the BER results.

The ASIC has an ADC with nominal resolution of $N_{ADC}=5$ bits and an Effective Number Of Bits (ENOB) of ~3.8 bits. An analog Phase-Lock Loop (PLL) was used to recover the symbols clock, while the data was sampled at the symbol rate of 28 Gsymbol/sec. The MLSE equalizer memory depth is $N_{isi}=4$ symbols, the principle architecture of which is shown in FIG. 1b.

Experimental Examples

The operation of the proposed blind channel acquisition algorithm (IMDP), the outcome of the intermediate procedure phases (FIG. 2) is described and analyzed for two cases: a back-to-back channel and a 40 km long channel.

The phases of the IMDP for a Back to back channel are illustrated in FIGS. 5-8.

Figure 5A:
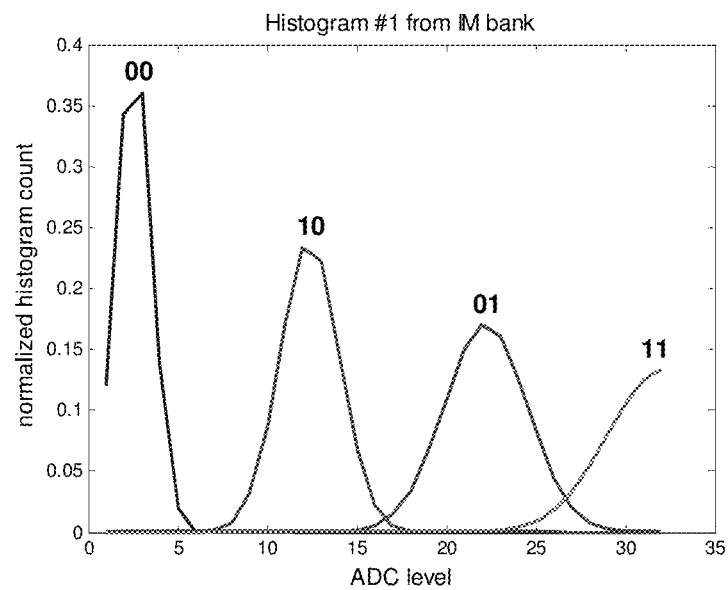
FIGS. 5a and 5b illustrate two normalized histograms during Phase # 1 of IMDP, for a channel memory depth of one symbol.
Figure 5B:
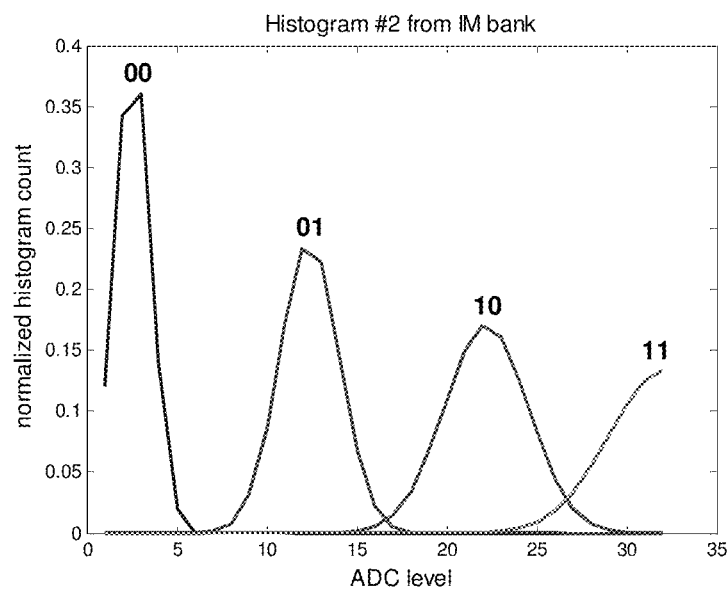

FIGS. 5a and 5b illustrate normalized histograms (a) $H_{\#1}^{(0)}$ and $H_{\#1}^{(1)}$ and during Phase # 1 of IMDP, for a channel memory depth of one symbol. Two different histogram sets $H_{\#1}^{(0)}$ and $H_{\#1}^{(1)}$, that can represent PDFs describing a channel with memory depth of one symbol, are shown. The histograms on the left hand side correspond to the increasing exponent j=0 in [Eq.22], whereas the histograms on the right hand side represent the decreasing exponent channel j=4 in [Eq.22] for $N_{isi}=4$. In fact, the branch (or histogram) labeled '01' in FIG. 5a has different mean and variance values, compared to the same branch (or histogram) in FIG. 5b. The same is true for branch '10'.

On the other hand, the edge branches '00' and '11' have the same mean and variance values due to the symmetry presented in [Eq.22]. Both histogram sets $H_{\#1}^{(0)}$ and $H_{\#1}^{(1)}$ and contain 32 branches each, which are divided into 4 groups, whereas each group is described by its mean and variance values (which coincide with the 4 histograms shown in FIGS. 5a-5b). $H_{\#1}^{(0)}$ and $H_{\#1}^{(1)}$ are the outcome of phase #1, and serve as a starting point for phase #2 of the IMDP.

Figure 6A:
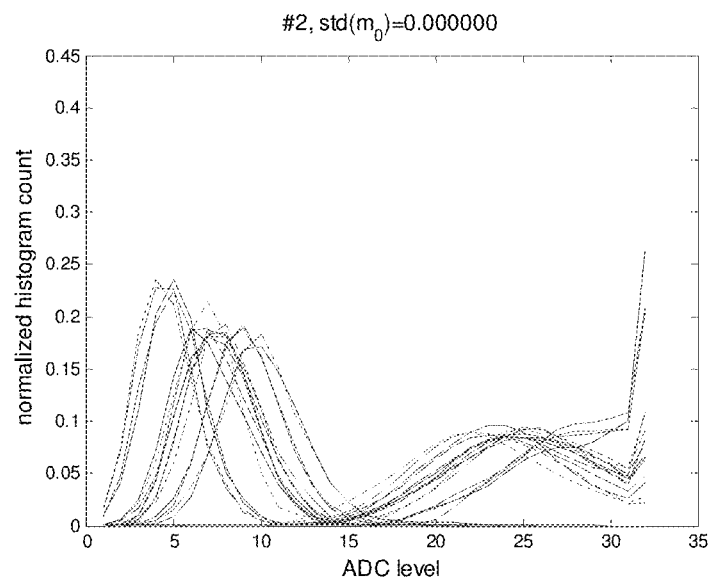
FIGS. 6a-6c show three normalized histogram sets obtained after phase # 2 of IMDP.
Figure 6B:
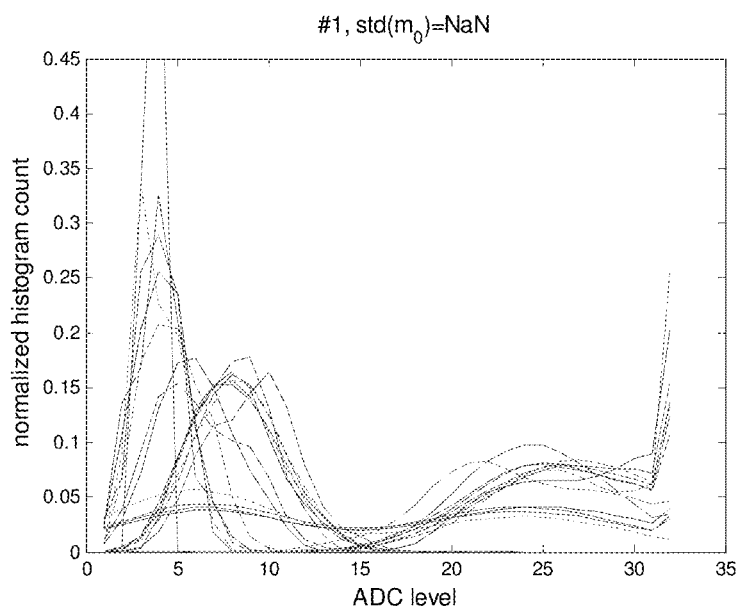
Figure 6C:
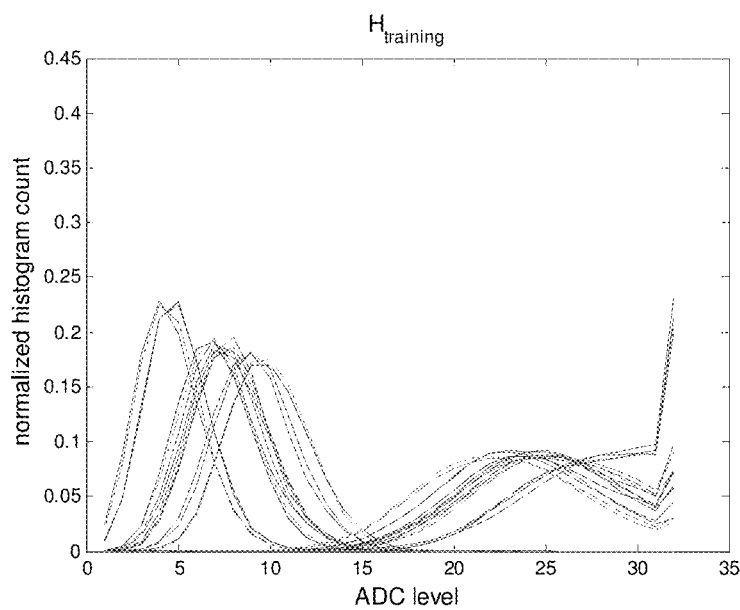

FIGS. 6a-6c illustrate normalized histogram sets obtained after phase # 2 of IMDP. FIGS. 6a and 6b show the histograms sets after 8 iterations for $H_{\#2}^{(0)}$(b) $H_{\#2}^{(1)}$. FIG. 6c shows the histograms set $H_{training}$ obtained by using a training sequence. It is clear that $H_{\#1}^{(0)}$ does not converge, whereas $H_{\#1}^{(1)}$ provides a good initial guess. The histogram sets $H_{\#2}^{(0)}$ and $H_{\#2}^{(1)}$ are obtained, starting from $H_{\#1}^{(0)}$ and $H_{\#1}^{(1)}$, respectively.

By comparing FIG. 6a to FIG. 6c, it is clear that the initial guess $H_{\#1}^{(0)}$ was not successful. On the other hand, comparing FIG. 6b to FIG. 6c, it is clear that that $H_{\#1}^{(1)}$ is a better guess which converges to histograms map similar to $H_{training}$, and therefore, is considered to be a successful initial guess. In addition to the visual effect, the similarity between $H_{\#2}^{(1)}$ and $H_{training}$ can be quantitatively measured by means of the parameter $D_{ED}$ defined in [Eq.38]. In addition, the convergence rate can be quantified by using [Eq.35].

Figure 7A:
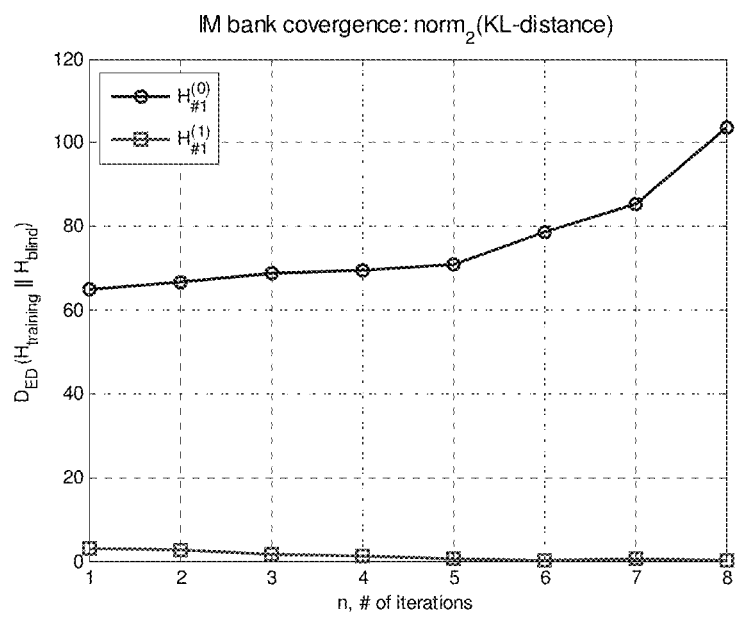
FIGS. 7a-7c show IMDP convergence monitoring during phase #2.

FIGS. 7a-7d show IMDP convergence monitoring during phase #2. FIG. 7a shows $D_{ED}$ convergence following [Eq.38]. The values of $D_{ED}$ throughout the 8 iterations of phase #2 are shown. In the experiment, X=8 was the worst case for IMDP number of iterations to converge. It is clear that $H_{\#1}^{(0)}$ (circles) diverges, whereas $H_{\#1}^{(1)}$ (squares) converges to zero in terms of $D_{ED}$, meaning that the obtained $H_{\#2}^{(1)}$ converges to $H_{training}$.

Figure 7B:
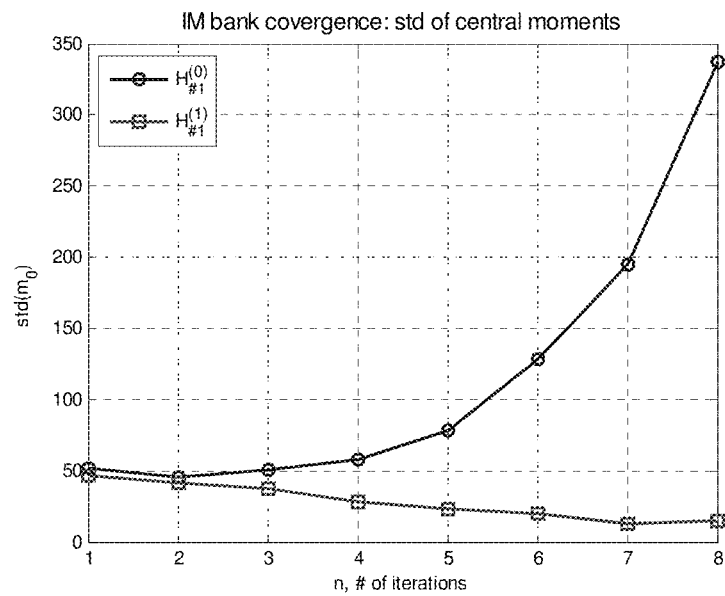

FIG. 7b shows a standard deviation of central moments [Eq.36], presenting the convergence rate in terms of standard deviation of the central moments, as defined in [Eq.35]. Similarly, convergence of $H_{\#1}^{(1)}$ (squares) and divergence of $H_{\#1}^{(0)}$ (circles) are observed. The (final) value of std($m_0$) for $H_{\#2}^{(1)}$ also goes to zero, indicating that all the histograms in $H_{\#2}^{(1)}$ have similar number of observations.

Figure 7C:
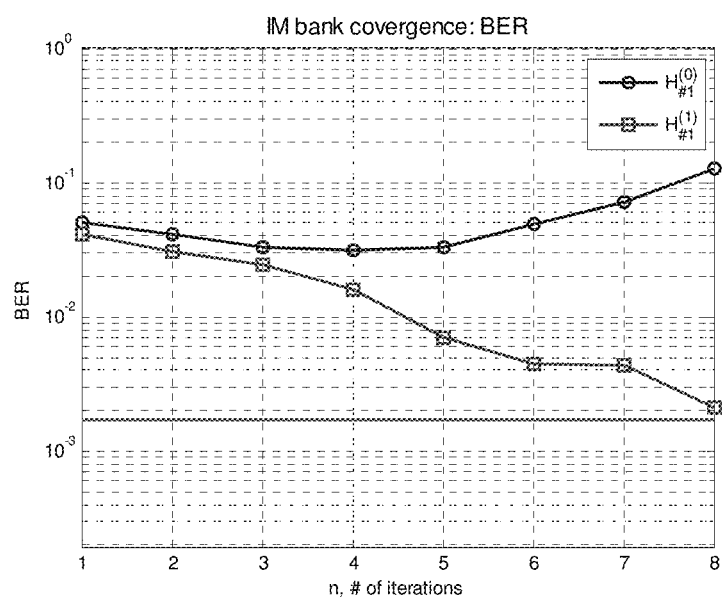

FIG. 7c shows convergence in terms of BER, presenting the bit error rate convergence during phase #2, compared to the BER obtained by training (solid line). The convergence in terms of BER is slower during the acquisition phase #2, as compared to $D_{ED}$ and to std($m_0$) convergences. However, it is shown in the following figures that the final BER convergence, at the end of the IMDP, is similar to the training case.

Figure 7D:
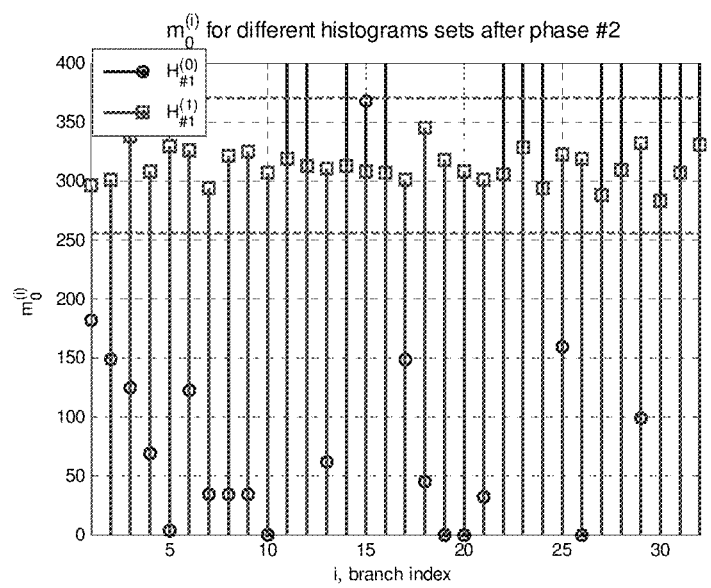
FIG. 7d shows IMDP convergence monitoring during phase #3.

FIG. 7d shows Phase #3 of IMDP during which, the convergence criterion of [Eq.34] is checked, presenting the validation of convergence criterion of [Eq.34], which forms phase #3 of the IMDP, as well as the values of the moments $m_0^{(i)}$ for various histograms in $H_{\#2}^{(0)}$ (circles) and $H_{\#2}^{(1)}$ (squares). It is clearly seen that $m_0^{(i)}$ of $H_{\#2}^{(1)}$ lie within the upper and lower thresholds defined by [Eq.35], as opposed to the $H_{\#2}^{(0)}$ counterpart. In hardware implementation, [Eq.34] is applied only to the $m_0^{(i)}$ of $H_{\#2}^{(1)}$, to save complexity and the duration of the acquisition process. The zero-th moments of $H_{\#2}^{(0)}$ are presented only for clarity and comparison insight.

FIGS. 8a-8e show the results of ISI optimization during phase #4 of IMDP, for the histograms set $H_{\#2}^{(1)}$.

Histogram sets are obtained for different shifts:

(a) $MP_{shift}=-2$, BER=$4.26\cdot10^{-1}$, $\langle \sigma_i^2 \rangle$ =89.21, (b) $MP_{shift}=-1$, BER=$3.15\cdot10^{-3}$, $\langle \sigma_{hu\,2} \rangle$ =12.21, (c) $MP_{shift}=0$, BER=$1.77\cdot10^{-3}$, $\langle \sigma_i^2 \rangle$ =10.4, (d) $MP_{shift}=1$, BER=$1.89\cdot10^{-3}$, $\langle \sigma_i^2 \rangle$ =10.41, (e) $MP_{shift}=2$, BER=$1.82\cdot10^{-3}$, $\langle \sigma_i^2 \rangle$ =10.53

Figure 8A:
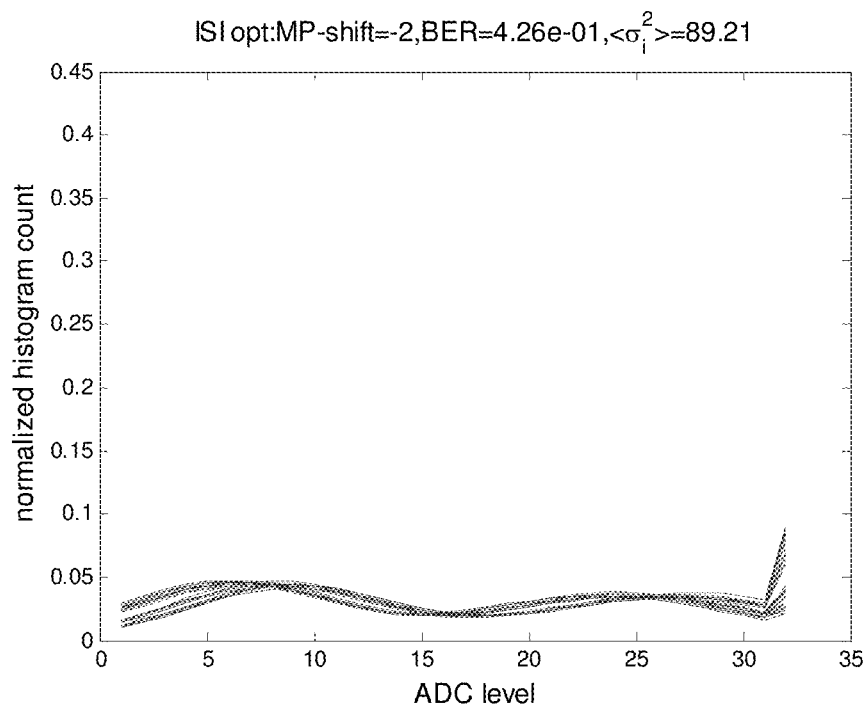
FIGS. 8a-8e show the results of ISI optimization during phase #4.
Figure 8B:
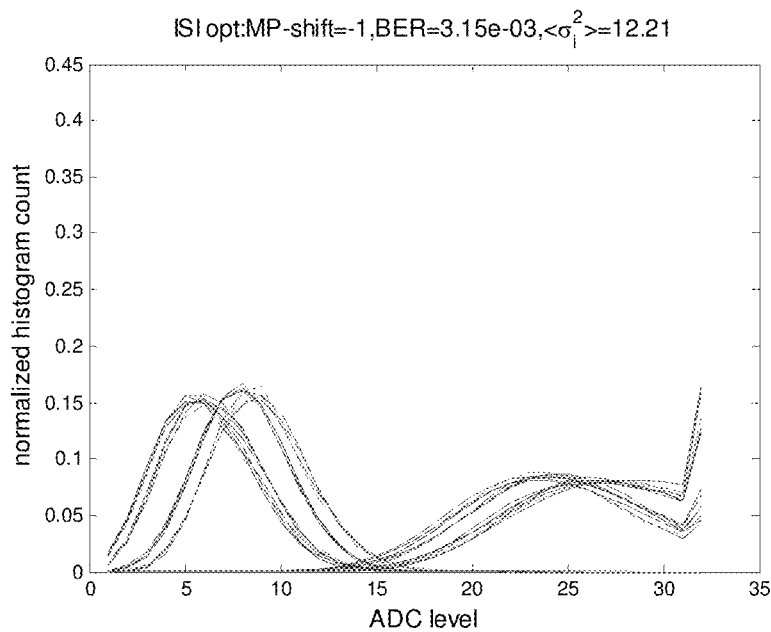
Figure 8C:
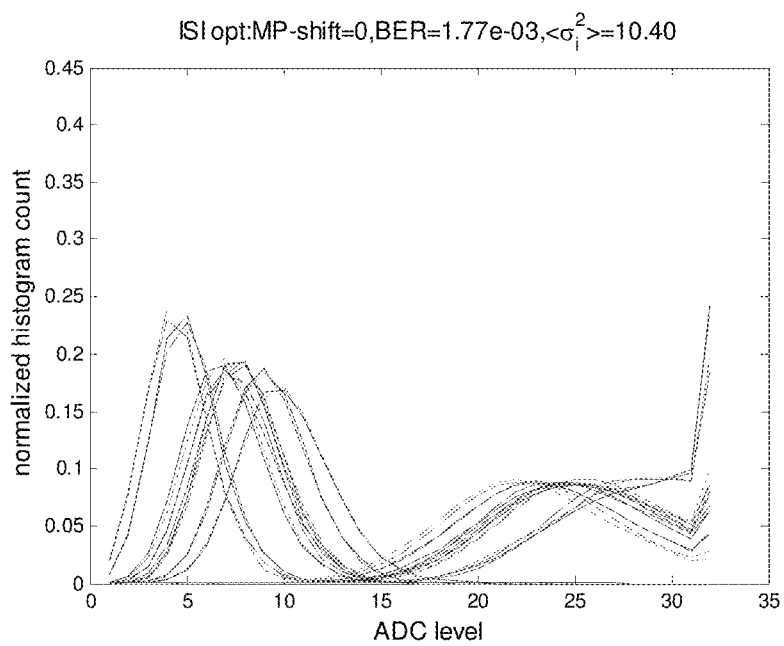
Figure 8D:
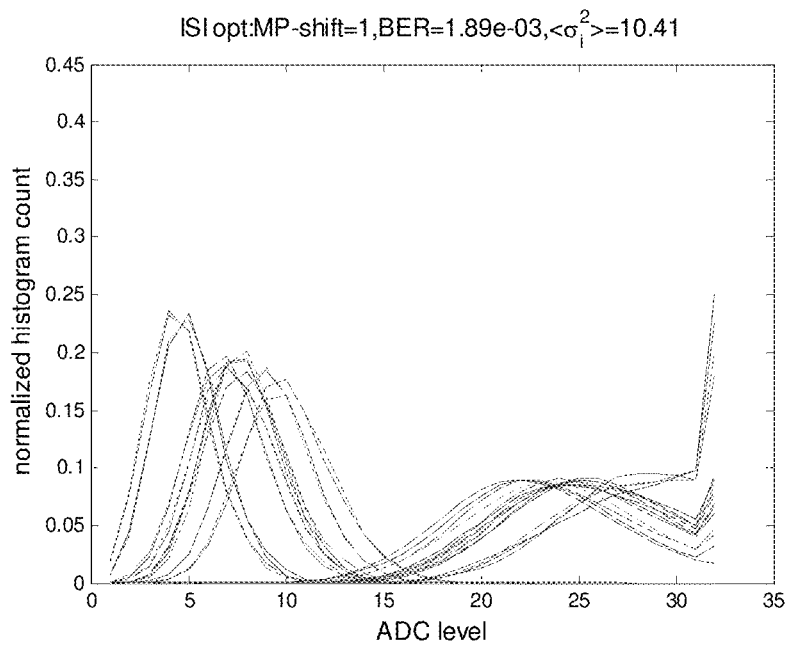
Figure 8E:
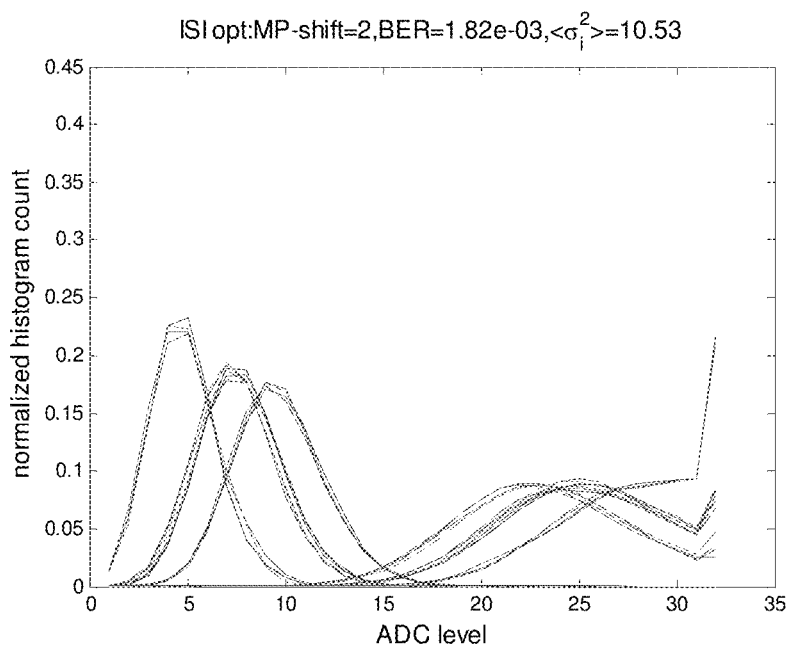

In each sub-plot, the titles contain the MP-shift, the BER and the average histograms variance calculated according to [Eq.45]. In this "simple" back-to-back case, the major portion of ISI comes from the frequency response of the analog front-end of the ASIC. It can be seen in FIGS. 8a-8e, that the effective smearing is between 1 and 2 symbol periods, resulting in three histogram sets, identified in FIGS. 8c-8e. The resulting BER in FIGS. 8c-8e is similar, since the memory depth of the implemented MLSE is higher than the effective smearing, $N_{isi}>N_{isi}^{channel}$. The optimal shift is chosen such that the residual ISI is minimal according to [Eq.45], which also results in the lowest BER. In this case, the optimal shift is zero, which also complies with the fact that the histogram set from FIG. 8c is very close in terms of $D_{ED}$ to the histogram set obtained by using the training sequence, shown in FIG. 6c, and having the same shift.

The phases of the IMDP for a 40 km optical link are illustrated in FIGS. 9-12. As predicted by [Eq.6], the initial histogram sets representing the channel with memory of one symbol duration $N_{isi}^{channel}=1$, $H_{\#1}^{(0)}$ and $H_{\#1}^{(1)}$ shown in FIGS. 5a-5b would not be sufficient, since they result in high initial BER.

Figure 9:
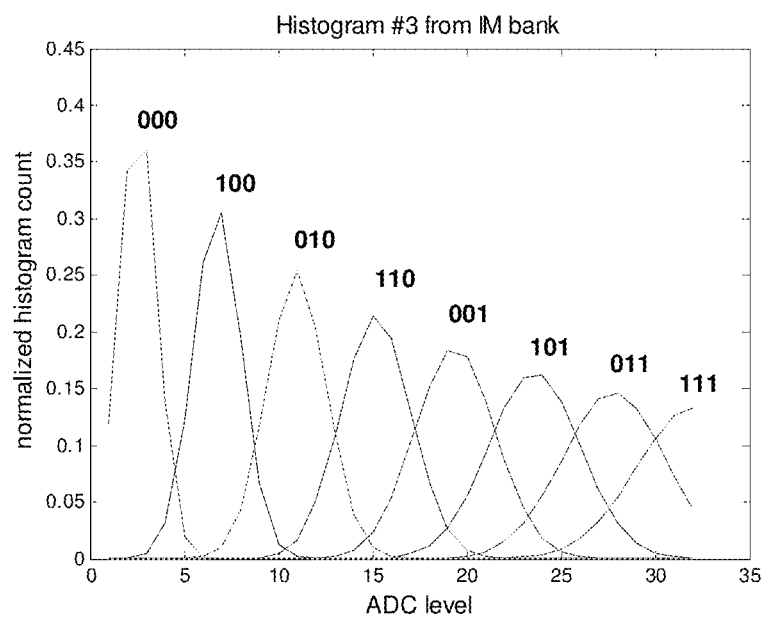
FIG. 9 illustrates Phase # 1 of IMDP Normalized histogram for a 40 km link.

FIG. 9 illustrates Phase # 1 of IMDP Normalized histogram $H_{\#1}^{(2)}$ corresponding to $N_{isi}^{channel}=2$, j=1 for a 40 km link. $H_{\#1}^{(0)}$ and $H_{\#1}^{(1)}$ correspond to $N_{isi}^{channel}=1$ are shown FIGS. 5a-5b. Therefore, if the link length is known a-priory, one can directly start the IMDP from histogram sets with higher channel memory, e.g., $N_{isi}^{channel}=2$ in this case. However, it is assumed that there is no side information about the link length (up to maximal length that the current hardware supports, which is about ~50 km). Consequently, the whole IMDP is repeated starting from three histogram sets: $H_{\#1}^{(0)}$ and $H_{\#1}^{(1)}$, shown in FIG. 5, and $H_{\#1}^{(2)}$ shown in FIG. 9.

Figure 10A:
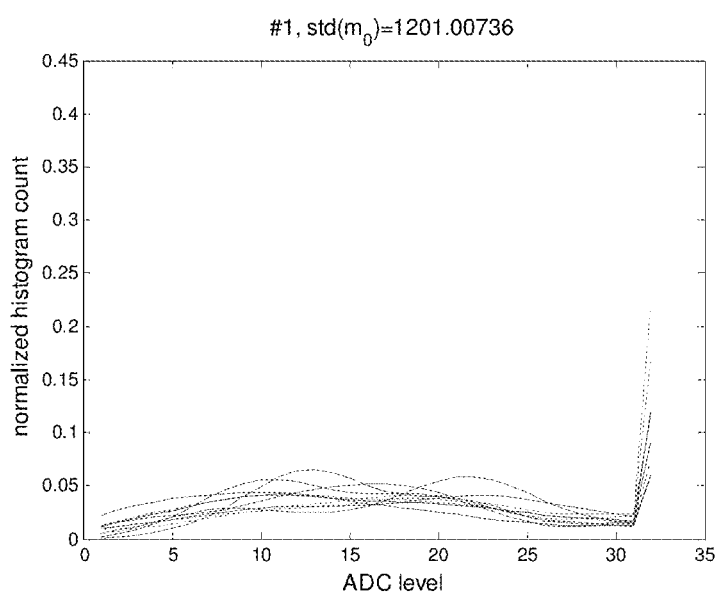
FIGS. 10a-10d present Phase #2 of the IMDP, which consists of 8 iterations.
Figure 10B:
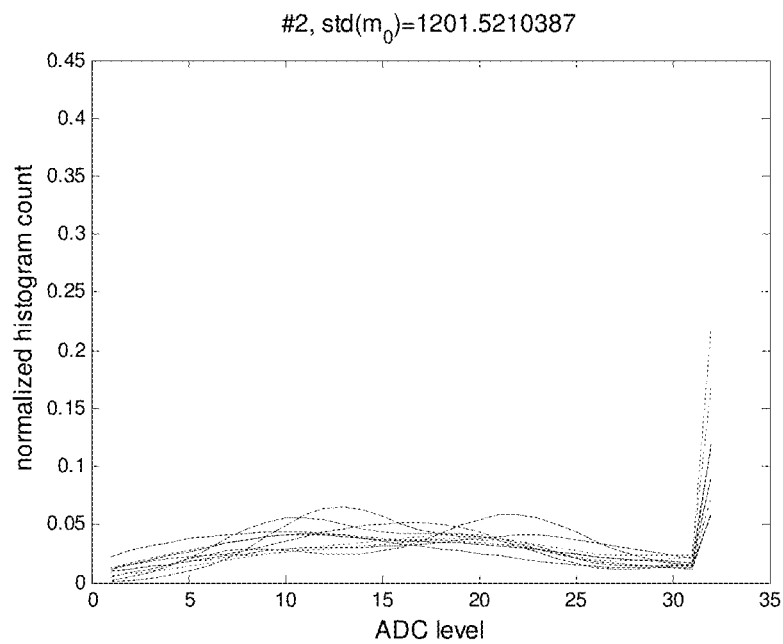
Figure 10C:
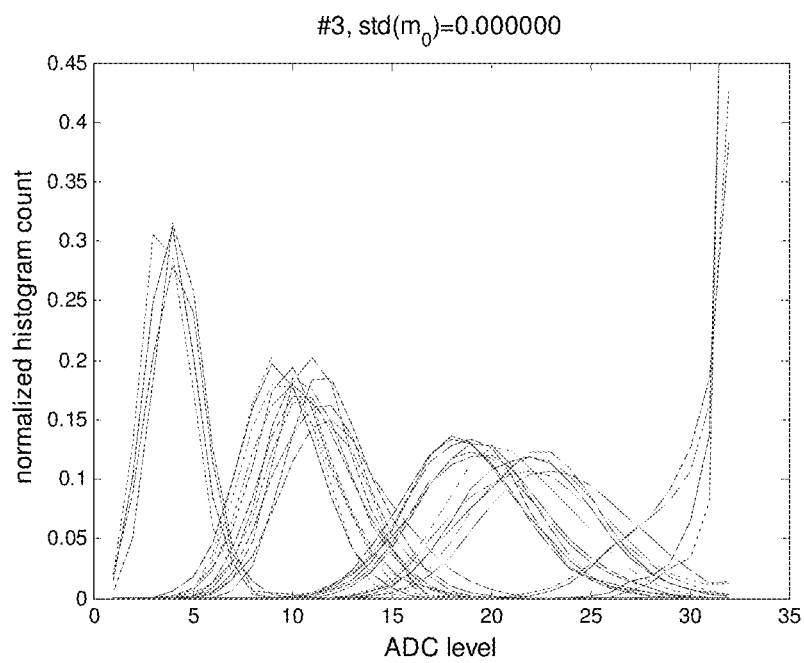
Figure 10D:
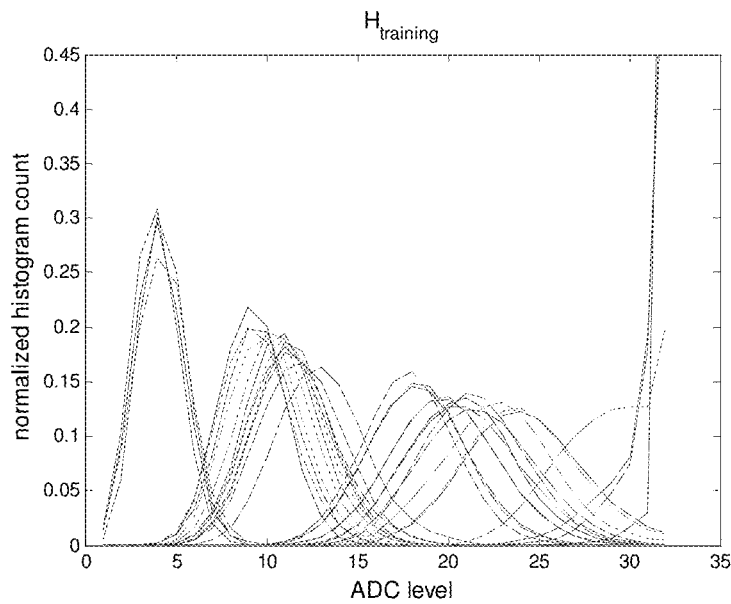

FIGS. 10a-10c present Phase #2 of the IMDP, which also consists of 8 iterations, resulting in the histogram sets $H_{\#2}^{(0)}$, $H_{\#2}^{(1)}$ and $H_{\#2}^{(1)}$, respectively. The histogram set obtained by using the training sequence $H_{training}$ is shown in FIG. 10d, for comparison. It is clear that $H_{\#1}^{(0)}$ and $H_{\#1}^{(1)}$ diverge, whereas $H_{\#1}^{(2)}$ provides a similar histogram map as with training. The histogram sets without sufficient channel memory, $H_{\#1}^{(0)}$ and $H_{\#1}^{(1)}$ diverge, whereas $H_{\#1}^{(2)}$ provides a good initial guess. The titles of FIGS. 10a-10c contain the std($m_0$) values after $8^{th}$ iteration, indicating quantitatively that only $H_{\#1}^{(2)}$ has successful convergence.

Figure 11A:
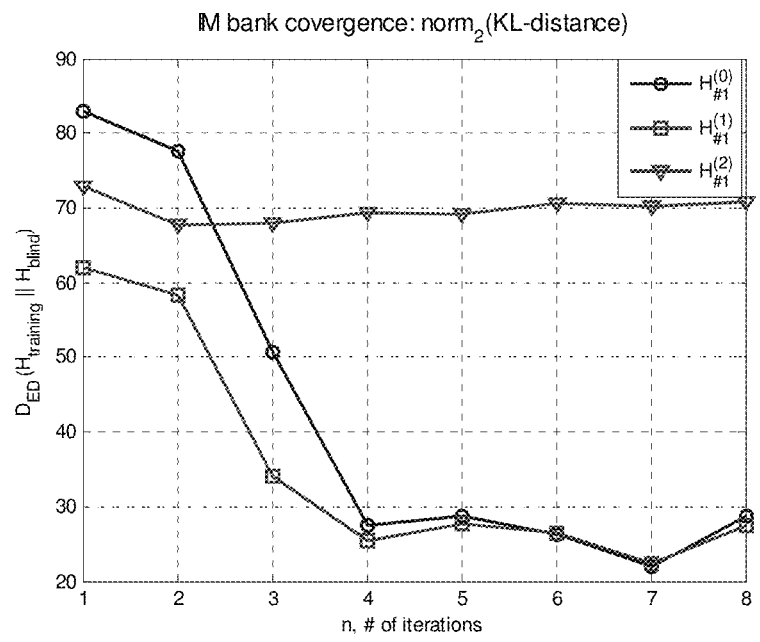
FIGS. 11a-11d show the convergence process during phase #2 of the IMDP, for a 40 km long optical link.
Figure 11B:
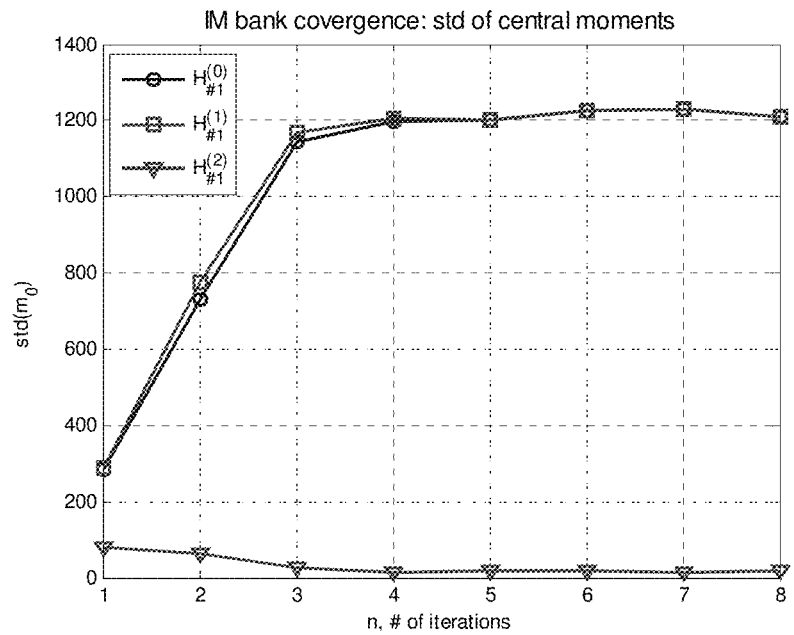
Figure 11C:
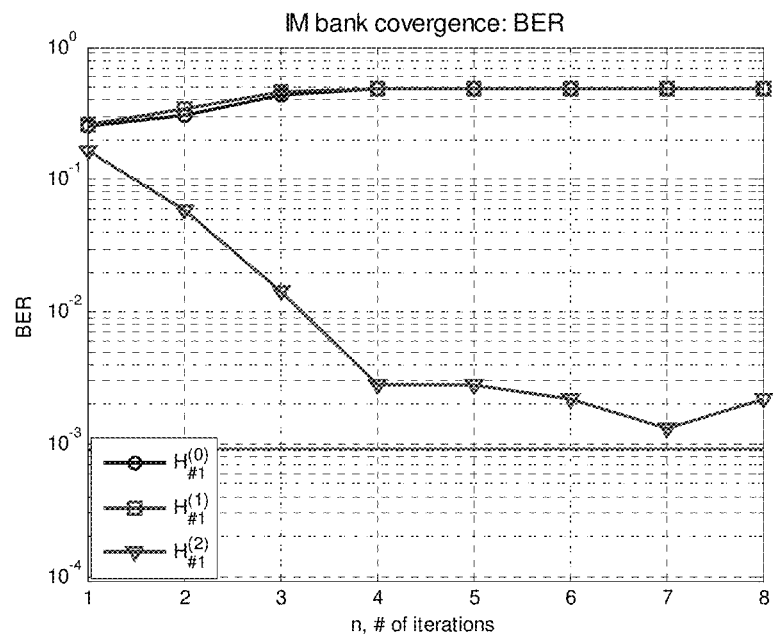
Figure 11D:
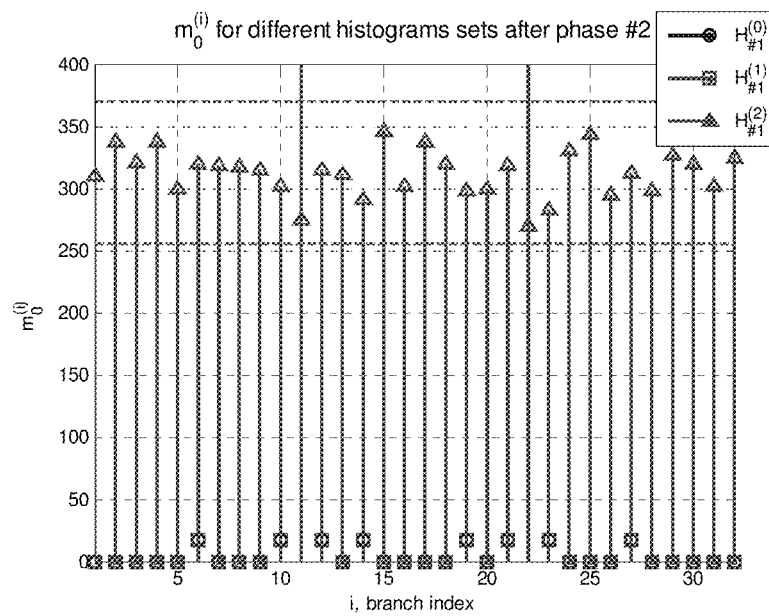

FIGS. 11a-11d show the convergence process during phase #2 of the IMDP, for a 40 km long optical link. The convergence in terms of $D_{ED}$ (defined by [Eq.45]) for the three histogram sets $H_{\#1}^{(0)}$ (circles) $H_{\#1}^{(1)}$ (squares) and $H_{\#1}^{(2)}$ (triangles) is shown on FIG. 11a. FIG. 11b shows the standard deviation of central moments defined by [Eq.36]. FIG. 11c shows convergence in terms of BER. FIG. 11d shows Phase #3 of IMDP by checking the convergence criterion defined by [Eq.34].

All the three sets appear to stabilize around a constant $D_{ED}$ value, but as already known from FIGS. 10a-10d, only $H_{\#2}^{(2)}$ tends to resemble the $H_{training}$. The fact that $H_{\#1}^{(0)}$ and $H_{\#1}^{(1)}$ stabilize around a constant $D_{ED}$ value, does not imply that they converged to a correct channel estimation. Rather the opposite is true, and a closer look at FIGS. 10a-10b reveals that the resulting histogram shapes in both sets almost uniformly spread throughout the ensemble range (the x-axis).

Despite the fact that $H_{\#2}^{(2)}$ converges, the final $D_{ED}$ value (after 8 iterations) for $H_{\#2}^{(2)}$ is higher than for $H_{\#2}^{(0)}$ and $H_{\#2}^{(1)}$ which eventually diverge. The reason for this is that $H_{\#1}^{(2)}$ converged to a suboptimal solution. $H_{\#2}^{(2)}$ is indeed quantitatively 'far' from $H_{training}$, since the $D_{ED}$ between them is not close to zero. This suboptimal solution will be improved during phase #4 of the IMDP. Thus, the KL-distance does not immediately show success, since several suboptimal solutions are possible, and only the optimal reference PDF (or its histogram representative) is relevant for comparison.

On the other hand, by observing the intermediate values of the std($m_0$) criterion (shown in FIG. 11b), one can conclude that $H_{\#1}^{(0)}$ and $H_{\#1}^{(1)}$ diverge, whereas $H_{\#2}^{(1)}$ converges (to a valid suboptimal solution). The BER convergence, shown on FIG. 11c, also reveals that the first two histogram sets diverge (BER=0.5) and the latter set converges to a suboptimal solution, indicated by a slightly higher BER than the one obtained with $H_{training}$ (solid purple curve).

The practical way to conclude whether a given histogram set is converged to a valid (possibly suboptimal) solution, without observing the resulting histogram sets $H_{\#2}^{(0)}$, $H_{\#2}^{(1)}$ and $H_{\#2}^{(2)}$, is to assure that all the zero-th moments of the resulting histograms within the set lie within a predefined range, given by [Eq.34]. FIG. 11d shows that only $H_{\#2}^{(1)}$ meets [Eq.33], and thus is the only selected metric that is being processed in phase #4.

FIGS. 12a-12e show the histogram sets representing the outcome of the ISI optimization Phase # 4 of IMDP for a 40 km long optical channel. As indicated by both BER and the average standard deviations (ref formula for mean (vars)), the MP-shift of one symbol (shown in) obtains the best performance.

Figure 12A:
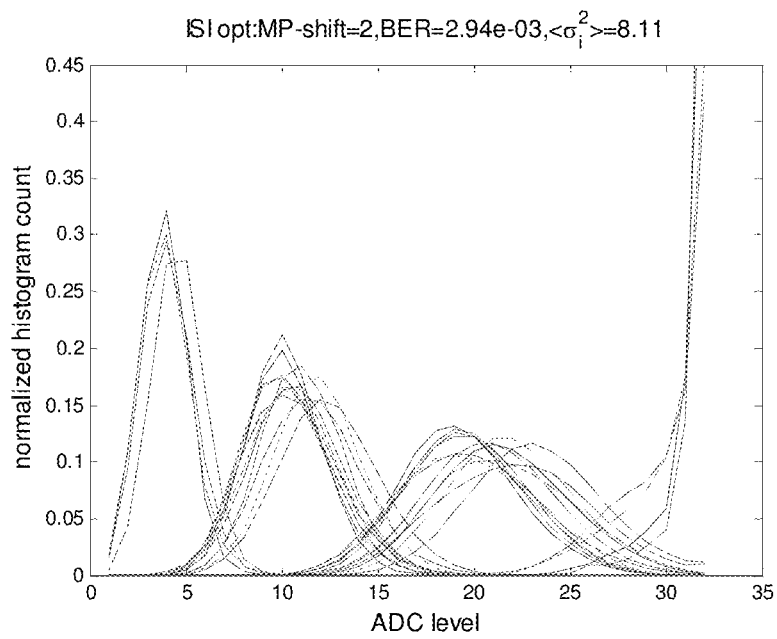
FIGS. 12a-12e show the histogram sets representing the outcome of the ISI optimization Phase # 4 of IMDP for a 40 km long optical channel.
Figure 12B:
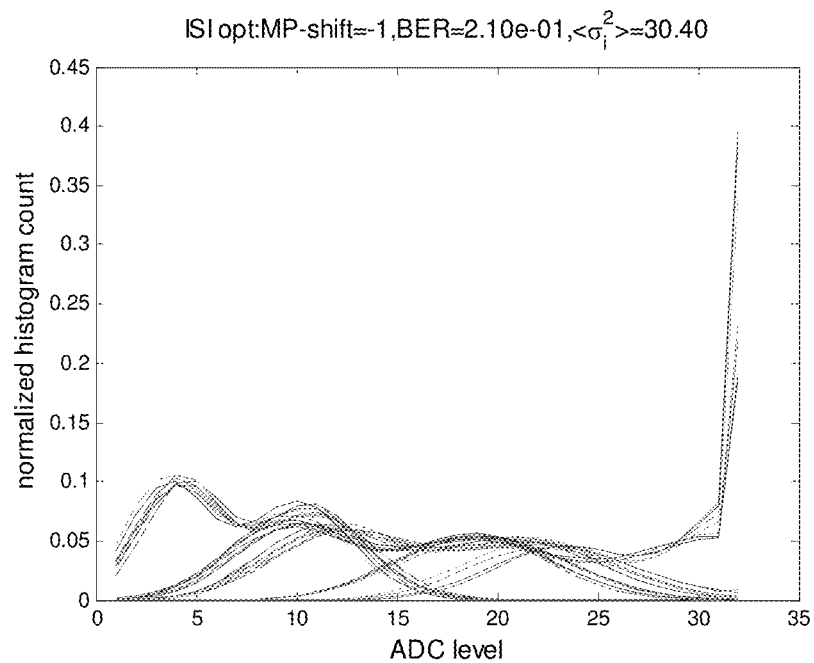
Figure 12C:
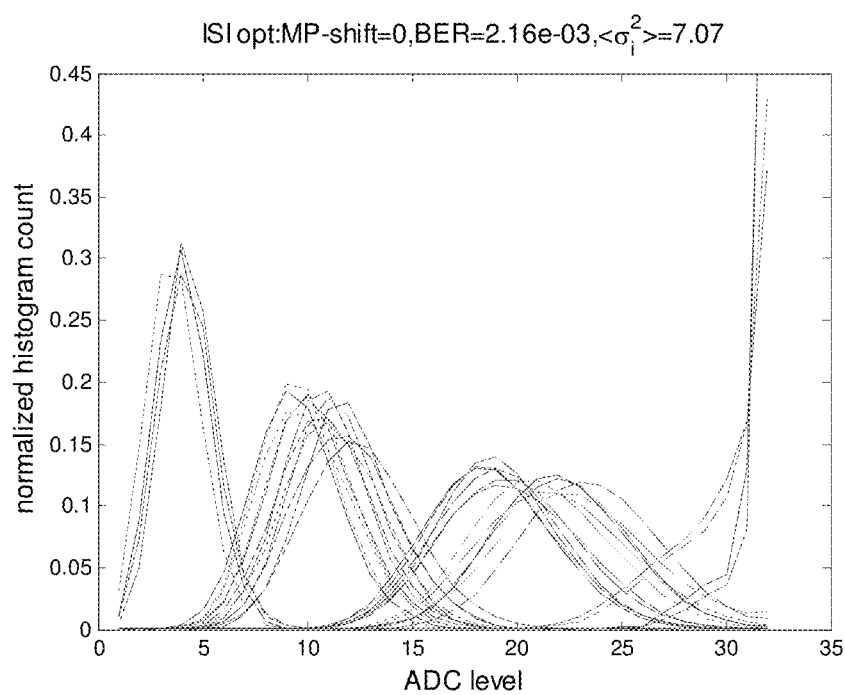

Histogram sets, obtained for different shifts are the following:

FIG. 12a: $MP_{shift}=-2$, BER=$3.01\cdot10^{-1}$, $\langle \sigma_i^2 \rangle$ =54.36, FIG. 12b: $MP_{shift}=-1$, BER=$2.1\cdot10^{-1}$, $\langle \sigma_i^2 \rangle$ =30.40, FIG. 12c: $MP_{shift}=0$, BER=$2.16\cdot10^{-3}$, $\langle \sigma_i^2 \rangle$ =7.07, FIG. 12d: $MP_{shift}=1$, BER=$1.15\cdot10^{-3}$, $\langle \sigma_i^2 \rangle$ =6.32, FIG. 12e: $MP_{shift}=2$, BER=$2.94\cdot10^{-3}$, $\langle \sigma_i^2 \rangle$ =8.11

Figure 12D:
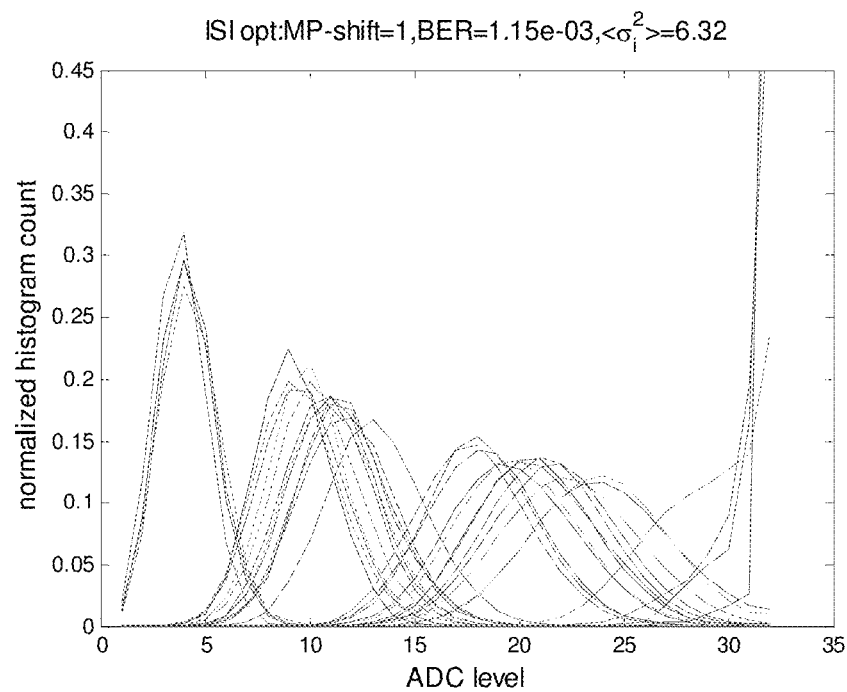
Figure 12E:
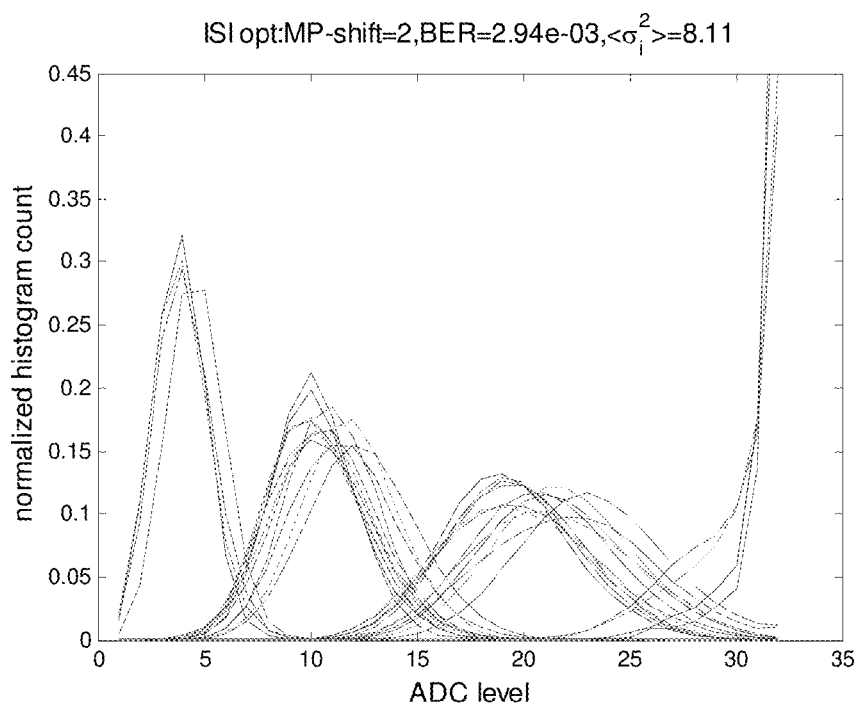

In addition, in FIG. 12d, $D_{ED}(H_{training}\|H_{\#4}^{(1)})=0.127$, is the lowest achieved value, which verifies that optimal solution is obtained.

Figure 13:
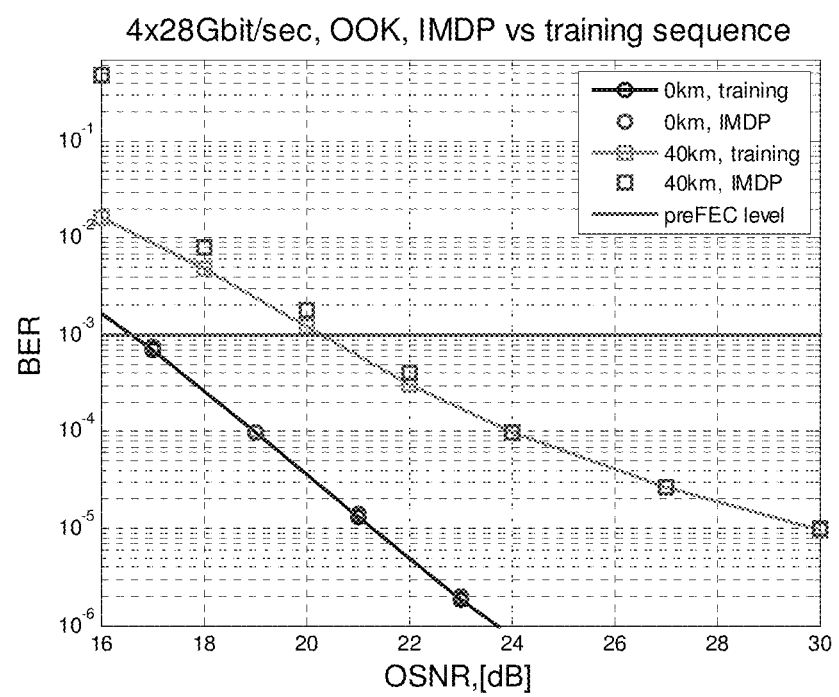
FIG. 13 shows Experimental BER curves comparing the training and the IMDP.

FIG. 13 shows the experimental measurements, comparing the BER results for various OSNR values, obtained by the data aided approach (training sequence) vs. the proposed blind channel acquisition algorithm (IMDP). The pre-FEC BER level of $10^{-3}$ is also shown for convenience. It can be seen that the proposed blind IMDP technique achieves BER values that are in very good agreement with the BER values obtained by the use of training sequence. Thus, it indicates that a reliable channel estimation is obtained by the proposed blind technique, for OSNR values that result in BER<$10^{-2}$.

The proposed IPMD requires neither additional hardware nor additional complicated calculations. The full blind equalization scheme was implemented in an Application Specific Integrated Circuit (ASIC) and was validated experimentally at the full data rate of 4×28 Gbit/sec. The overall blind channel acquisition time is measured to be a few milliseconds, which makes it suitable for use in reconfigurable optical network environment that requires 50 msec recovery time.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. A method for performing blind channel estimation for an MLSE receiver in high speed optical communication channel, comprising:
    a) performing Initial Metrics Determination Procedure (IMDP) using joint channel and data estimation in a decision directed mode, by:
        a.1) generating a bank of initial metrics that with at least one metric having convergence tendency, based on an initial coarse histograms generated by a set of FIR filters representing parameters of said channel;
        a.2) selecting a first metric from said bank of initial metrics;
        a.3) activating an iterative decoding procedure during which, a plurality of decision-directed adaptation learning loops are carried out for a selected metric, to perform an iterative histograms estimation for finely tuning the channel estimation, while during each iteration, decoding samples of the signal received via said channel by an MLSE decoder, based on a previous estimation of said channel during the previous iteration;
        a.4) checking whether the resulting metrics are converged using sampled standard deviation of the central moments, and if convergence is not achieved, selecting the next metrics set from said bank, otherwise;
        a.5) performing ISI optimization by said MLSE receiver using metrics for which convergence has been achieved;
    b) if the initial metrics bank is run out of metrics sets, repeating said IMDP over again; and
    c) using said decision-directed adaptation loops for tracking variations of said channel during steady state operation.

2. A method according to claim 1, wherein the checking whether the resulting metrics are converged is performed using a Z-test.

3. A method according to claim 1, wherein the convergence tendency of the histogram set is monitored by using the sampled standard deviation of the central moments after a predetermined number of iterations.

4. A method according to claim 1, wherein the convergence tendency of the histogram set is monitored, based on a training sequence.

5. A method according to claim 1, wherein the ISI optimization is performed by:
    a) collecting several channel estimates, while each time, setting a different Match Point (MP)-shift between the stream of ADC samples and the stream of the corresponding decision bits; and
    b) selecting the MP-shift that yields the minimal variances-average of the histograms.

* * * * *